INVENTOR
C.G. MILLER
BY
R. Marino
ATTORNEY

Nov. 28, 1950

C. G. MILLER
AUTOMATIC CALL RECORDING SYSTEM
FOR AUTOMATIC TELEPHONY 2,531,637

Filed April 24, 1946

INVENTOR
C.G. MILLER
BY
ATTORNEY

INVENTOR
C. G. MILLER
BY
ATTORNEY

Nov. 28, 1950

C. G. MILLER
AUTOMATIC CALL RECORDING SYSTEM
FOR AUTOMATIC TELEPHONY 2,531,637

Filed April 24, 1946

INVENTOR
C. G. MILLER
BY
ATTORNEY

INVENTOR
C. G. MILLER
BY
ATTORNEY

Nov. 28, 1950

C. G. MILLER
AUTOMATIC CALL RECORDING SYSTEM
FOR AUTOMATIC TELEPHONY 2,531,637

Filed April 24, 1946

INVENTOR
C. G. MILLER
BY
ATTORNEY

Nov. 28, 1950

C. G. MILLER
AUTOMATIC CALL RECORDING SYSTEM
FOR AUTOMATIC TELEPHONY 2,531,637

Filed April 24, 1946

INVENTOR
C.G. MILLER
BY
ATTORNEY

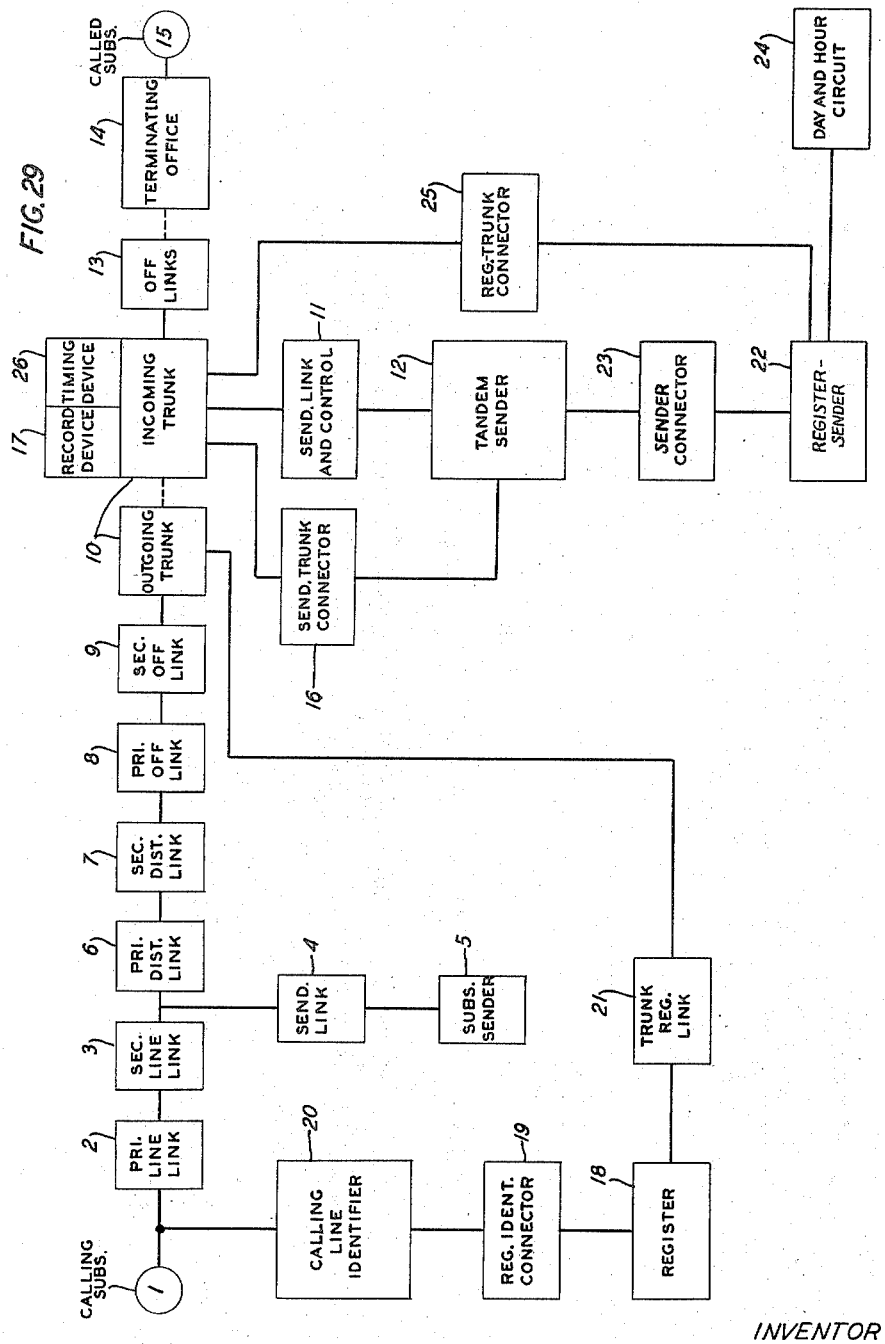

Patented Nov. 28, 1950

2,531,637

UNITED STATES PATENT OFFICE 2,531,637

AUTOMATIC CALL RECORDING SYSTEM FOR AUTOMATIC TELEPHONY

Charles G. Miller, Montclair, N. J., assignor to Bell Telephone Laboratories, Incorporated, New York, N. Y., a corporation of New York Application April 24, 1946, Serial No. 664,568

9 Claims. (Cl. 179—7.1)

This invention relates to telephone systems and more particularly to those systems in which a record is made of all items of record information pertaining to calls for which the subscribers placing the calls are to be charged.

In telephone systems where some connections made over trunks through common switching centers, an economy is effected if the recording equipment can be located at the switching centers rather than at the various local offices where such calls originate. The present invention discloses means for accomplishing this result, including suitable means for transmitting the various items of record information to the recording equipment at the switching centers.

In accordance with the present invention, some items of record information such as, for example, the office and number of the calling station and the office and number of the called station, are collected at the office of origin by means of common controlling equipment and transmitted over the partially completed connection to suitable receiving devices which then control a printing device or other suitable recording apparatus to make a permanent record of such information. The duration of the completed connection is also timed by suitable means associated with the connection and the day and hour at which the call is made, together with the elapsed connection time, are recorded.

A principal feature of the present invention is the use of a plurality of electrical frequencies for transmitting items of record information from the point of collection to the receiving device, said items of record information being suitably translated into combinations of frequencies which, transmitted over the partially established connection, actuate the receiving device.

Other features of this invention are the provision, in the trunk over which the connection is established, of devices for timing and recording the duration of the connection and the provision of other devices, common to the trunks, for recording the day and hour at which the call is made.

The invention is illustrated in connection with its application to a so-called tandem telephone system wherein the connection between the calling station and the called station is routed through a tandem switching office. It should be understood, however, that this application is given by way of example only, as it will be obvious to those skilled in the telephone art that the invention involves no limitations of any kind that restrict, or tend to restrict, its use to any specific network of telephone exchanges.

Also, the invention has been shown for the purposes of this description, as applied to a telephone system of the well-known cross-bar type in which the switch units thereof are of the structure disclosed in the patent to J. N. Reynolds No. 2,021,329, granted November 19, 1935, although it is realized that the use of the invention is entirely independent of the type of switch employed and that it is equally applicable to telephone systems comprising panel, step-by-step or other familiar and well-known switching devices.

The aforementioned features and other features of this invention will be more readily understood from the following description, the appended claims, and the attached drawings, in which:

In Fig. 3, the extension of the connection to a called subscriber's station is also indicated;

Figure 1:
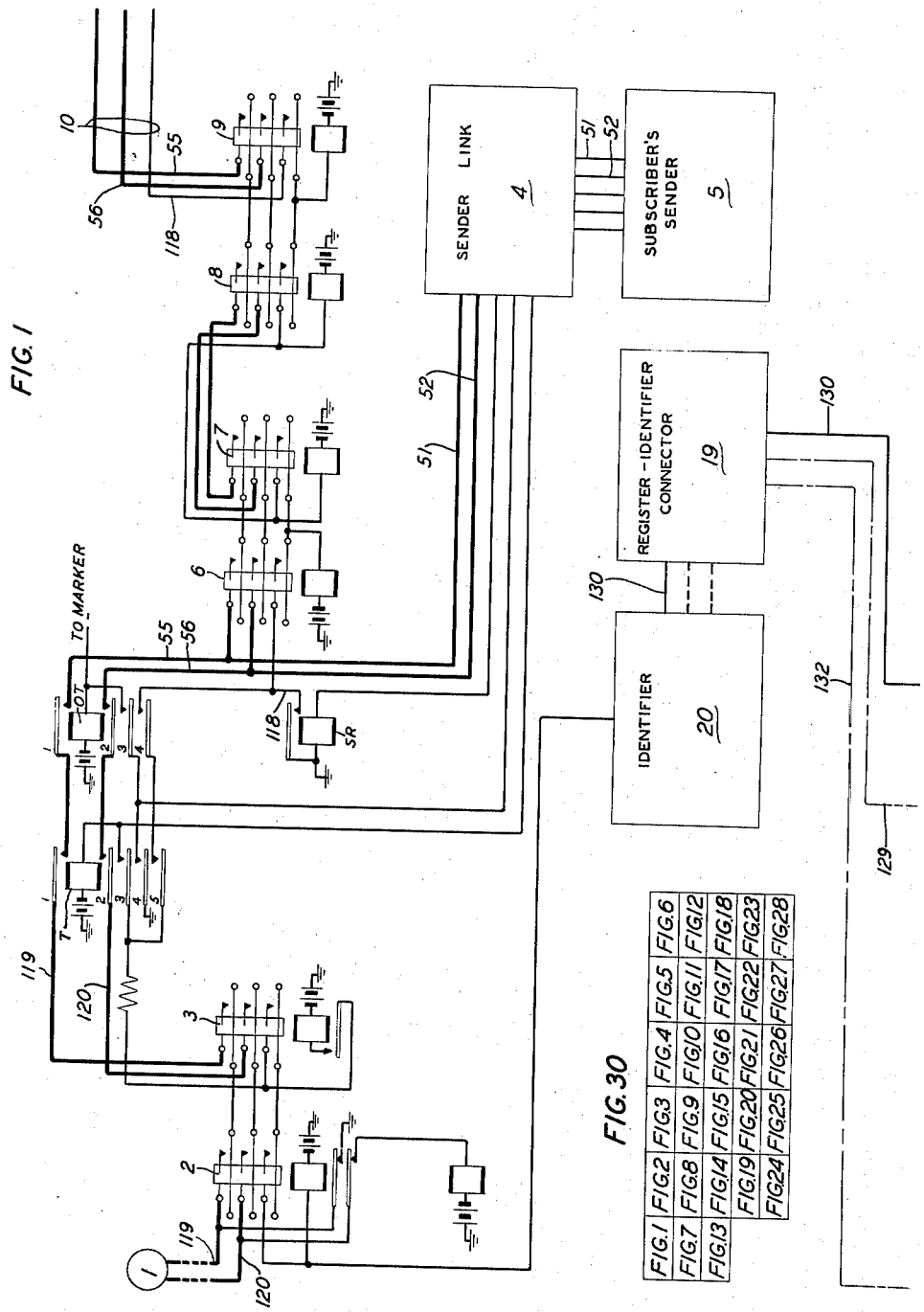
Fig. 1 shows a calling-subscriber's station and the equipment in a local central office for establishing a connection between said station and an outgoing trunk to a tandem office.

Figs. 9, 10, 14, 15, 16 and 19 to 28, inclusive, show the circuit of the tandem sender;

Fig. 29 is a block diagram showing the relation of the various circuits employed in connection with an automatically recorded call between a subscriber's station in a local office, through a tandem office, to a subscriber's station in another local office; and Fig. 30 shows the manner in which the above-mentioned figures (except Fig. 29) should be arranged with respect to one another to disclose completely the invention.

Before proceeding with a detailed description of the operation of the various circuits, I will first describe the general functions of the equipment by reference to Fig. 29.

Referring to this figure, when a call is initiated at station 1 by the removal of the receiver at that station, the station is connected in the well-known manner through the primary line link 2, secondary line link 3 and sender link 4, to a subscriber's sender 5 which operates to transmit dial tone to the calling station. Upon receipt of this tone, the subscriber at station 1 dials the office code and number of the station desired. This information is registered in the subscriber's sender 5 which then operates, with the aid of a marker (not shown) to extend the connection through the required number of line-extending switches such as, for example, the primary district link 6, secondary district link 7, primary office link 8 and secondary office link 9, to a trunk 10 the outgoing end of which is at the local office, and the incoming end at the tandem office.

At the tandem office a sender link and controller 11 associates a tandem sender 12 with the trunk. The called-line information registered in the subscriber's sender 5 is then transmitted to and registered in the tandem sender 12 by means of revertive pulses from the tandem sender in the well-known manner. When the called-line information has been transmitted to the tandem sender 12, the subscriber's sender 5 is disconnected. The tandem sender 12, with the assistance of a marker (not shown), extends the connection through the tandem office links 13 to the terminating office 14 and through the switches of the terminating office to the called station 15 in the usual manner.

In this invention, however, when the called-line information has been registered in the tandem sender 12, the latter is connected to the trunk 10 by a sender trunk connector 16. The items of called-line information registered in the tandem sender 12 are then transmitted to a recording device 17 forming part of the equipment of the trunk 10 and are, by the recording device, recorded on a paper tape or similar means.

When the connection is extended under control of the tandem sender 12 to the terminating office 14, a register 18 is connected by a register-identifier connector 19 to a calling-line identifier 20 associated with the lines of the office in which the calling line is located and with lines of other offices. The register 18 is further connected to the outgoing end of the trunk 10 by a trunk-register link 21. A register-sender 22 is also connected to the tandem sender 12 by a sender connector 23.

The identifier 20 operates to determine the office in which the calling station is located and the number of said station and to transmit this information to the register 18 where said information is registered. The register 18 then transmits the said information by means of multifrequency pulses over the trunk to the register-sender 22 and the information is registered therein. At the completion of this registration the register 18 is disconnected from the identifier and from the trunk.

A day and hour circuit 24 is connected to the register-sender 22 by suitable means and said register-sender is connected to the incoming portion of the trunk 10 by a register trunk connector 25. The day and hour on which the call is made and the calling-line information registered in the register-sender 22 are then transmitted to equipment associated with the incoming portion of the trunk 10 and recorded on the tape by the recording device 17. When said recording is completed the register-sender 22 is disconnected from the trunk.

When the connection is extended under the control of the tandem sender 12 to the called station 15 the tandem sender is disconnected from the trunk. When the call is answered by the removal of the receiver at station 15 a timing device 26 associated with the incoming portion of the trunk 10, commences to measure the duration of conversation time. At the termination of the call by the replacement of the receiver at station 15, the elapsed conversation time, measured by the timing device 26, is recorded on the tape by the recording device 17. If the conversation time exceeds 99 minutes, the elapsed time is printed at the end of each 99-minute period as well as at the termination of the call.

Disconnection is under control of the calling station in the usual manner.

Having described the general organization of the telephone system as well as the manner in which the present invention appertains thereto, the detailed operation of the latter will now be described by means of the specific example of a ticketed call established between a calling-subscriber's station and a called subscriber's station.

*Connection of calling station to tandem sender*

Referring to Fig. 1, when a call is originated by the removal of the receiver at station 1, the calling line is extended by the operation of primary line link 2, secondary line link 3, relays T and OT and sender link 4 to a subscriber's sender 5 in the usual manner. After receiving dial tone, the calling party dials the office code and number of the station with which connection is desired (in this case the office code and the number of station 15). The subscriber's sender 5 registers the office code and number dialed and, with the assistance of a marker (not shown) causes the operation of primary district link 6, secondary district link 7, primary office link 8, and secondary office link 9 in the well-known manner to select an outgoing trunk, in this case trunk 10, which terminates at the tandem office.

The subscriber's sender, when it has tested the trunk 10 and found it idle, joins, in a manner not shown, tip conductor 51 to ring conductor 52 thereby completing a circuit extending from battery through the lower filament of lamp LP, lower winding of relay AA, No. 2 contacts of relay T1, lower left-hand winding of coil C3, conductor 54, No. 2 back contacts of relay TR, No. 4 back contacts of relay TC1, winding of polarized relay P, No. 3 back contact of relay TC1, conductor 56 extended through secondary office link 9, primary office link 8, secondary district link 7, and primary district link 6, conductor 52 extended through sender link 4 and joined to conductor 51 in subscriber's sender 5, conductor 51 extended through primary district link 6, secondary district link 7, primary office link 8 and secondary office link 9, conductor 55, No. 2 and No. 1 back contacts of relay TC1, No. 1 back contacts of relay TR, conductor 53, upper left-hand winding of coil C3, No. 1 contacts of relay T1, upper winding of relay AA, and upper filament of lamp LP to ground. Relay AA operates over this path and the closure of its contacts extends ground by way of No. 3 back contacts of relay D to conductor 57 within bracket 58, to the sender link and controller 11, causing said sender link and controller to connect the tandem sender to the trunk. For a description of the construction and operation of the sender link and controller, reference may be had to Patent No. 2,224,251 granted to A. J. Busch et al. on December 10, 1940.

*Registration of called-line information in tandem sender*

When the tandem sender is connected to the trunk by the sender link and controller 11, the latter grounds conductor 212 within bracket 213, thereby causing the operation of relay SC1 over an obvious circuit which, in turn, operates relay SC2 over a circuit extending from battery through winding of relay SC2, No. 10 contacts of relay ON2, and No. 8 contacts of relay SC1 to the aforesaid ground on conductor 212. The sender link and controller 11 then indicates whether the trunk is on one of the first ten or on one of the last ten of the trunk frames by grounding conductor 214 or conductor 215 thereby operating relay F00 or relay F10, conductor 214 being grounded and relay F00 operated if the trunk is on one of the first ten of the trunk frames and conductor 215 being grounded and relay F10 operated if the trunk is on one of the last ten of the trunk frames.

The sender link and controller 11 also indicates the number of the trunk frame on which the trunk is located by grounding one of the ten conductors in the conductor group 218 thereby causing the operation over a circuit (not shown) of the appropriate one of the select magnets SM0 to SM9 of the registers of the tandem sender shown in Fig. 2B, and this information is registered on register FR by the operation (in a manner not described) of the hold magnet FRH of said register. The called-line information, registered in subscriber's sender 5 is also transferred by the well-known revertive-pulse method to the tandem sender, relay STA being the stepping relay, the successive operations and releases of which in response to pulses are counted by counting relays 1P to 6P causing the operation of appropriate select magnets SM0 to SM9 to register on registers OB, OG, IB, IG, FB, FT and FU, by the operation of their respective hold magnets OBH, OGH, IBH, IGH, FBH, FTH, and FUG, a series of seven digits representing the called-line information. In connection with these operations relays ON1, ON2, WT, S6, RV3, FO3, DST, FS1, RV, and L2 are operated and the hold magnets above referred to are locked over conductor 61 to ground on the No. 6 contacts of relay ON1.

The tandem sender used in the present embodiment of the invention is similar to that described in Patent No. 2,283,395 granted to W. B. Strickler on May 19, 1942, and reference may be had to that patent for a more complete description of the construction of the tandem sender and the operation of the circuits involved in the registration of the trunk location and of the called-line information briefly alluded to herein. It is believed sufficient here to mention that the tandem sender proceeds with the necessary operations to extend the connection immediately upon the registration therein of the number of called digits required for such operations.

*Recording called-line information*

When registration of the called line information in the tandem sender is completed, relay S operates over a circuit from battery through the winding of said relay, No. 1 contacts of relay WT, No. 3 contacts of relay AT, conductor 64, within bracket 65, to ground at No. 2 contacts of the operated hold magnet FUH of register FU. The No. 1 contacts of relay S apply battery through protective resistance RR2 to conductor 66 to the sender-trunk connector 16 causing said sender-trunk connector to connect the tandem sender to the trunk circuit. The sender-trunk connector 16 is similar to the connector shown in Patent 2,089,338, granted to W. W. Carpenter et al. on August 10, 1937, and reference is made to that patent for a more complete understanding of its construction and operation.

Figure 4:
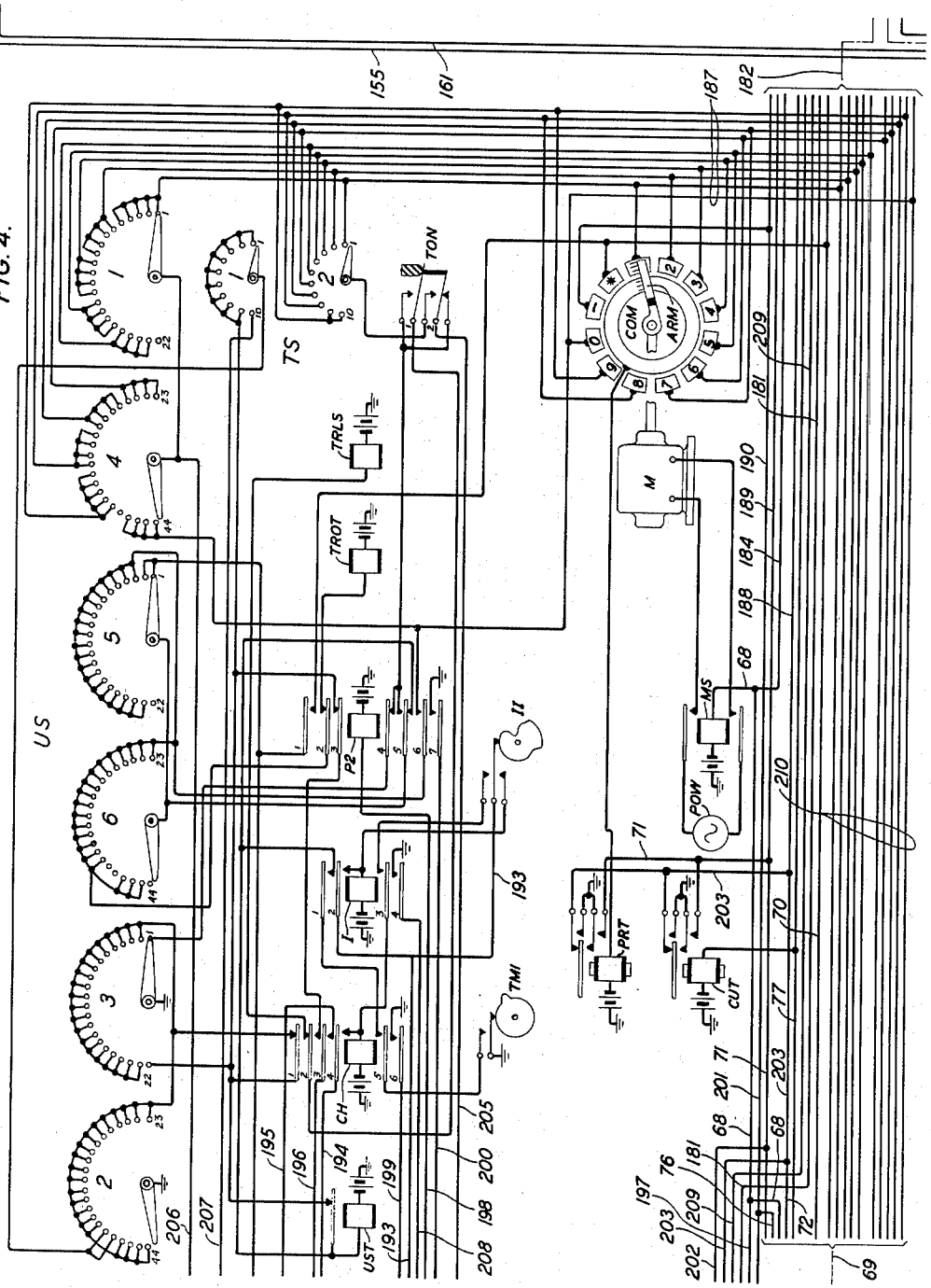

Referring to Fig. 4, the trunk is provided, at the tandem office, with a printing device of well-known form, comprising a print wheel (not shown) for printing characters on a paper tape, driven by motor M which also drives contact arm ARM over commutator COM which has segments corresponding in position with the characters on the print wheel. Magnet PRT, when operated, presses the print wheel against the paper tape printing thereon the character, which, at the moment, is adjacent to the tape. Magnet CUT, when operated actuates a device (not shown) which cuts the tape.

The off-normal contacts DON of switch DS will be in the position shown only when switch DS is in normal position as shown. With switch DS in normal position, when the tandem sender is connected to the trunk by the sender-trunk connector 16, battery through the rotary magnet DROT of switch DS, No. 2 back contact of off-normal contacts DON, No. 2 contacts of relay E, and conductor 67, extended through sender-trunk connector 16 to ground through the winding of relay TC01, operates said relay TC01. The current through this circuit is not sufficient to operate rotary magnet DROT. If switch DS is not in normal position, which, as shown later, will be the case if ticketing on a previous call has not been completed, this circuit will be interrupted by No. 2 contacts of off-normal contacts DON and operation of relay TC01 will await the return of switch DS to normal position. Relay TC01, when operated, connects ground through its No. 1 contacts to conductor 68 extended through sender-trunk connector 16 and within bracket 69, through the winding of relay MS to battery, operating relay MS, which connects a source of power POW to motor M of the printing device thereby starting said motor. The No. 2 contacts of relay TC01 ground the normal terminal of arc No. 1 of switch MTS thereby completing an operating circuit for stepping magnet MST of switch MTS through its own contacts. Stepping magnet MST breaks this circuit by opening its own contacts and releases, advancing the brushes of switch MTS to the No. 1 terminals. Conductor 70 is thereby grounded through No. 3 contacts of relay TC01, No. 2 normal contact of relay PM1 and the brush of arc No. 2 of switch MTS. Conductor 70 is connected through sender-trunk connector 16 and within bracket 69 to the segment of commutator COM of the printing device, which corresponds to an asterisk on the print wheel. When the rotating arm ARM of the printing device reaches said segment, print magnet PRT operates through arm ARM to ground on conductor 70, thereby printing an asterisk on the tape. Operation of magnet PRT applies ground through its contacts to conductor 71, within bracket 69 and through sender-trunk connector 16 and the winding of relay PM1 to battery, thereby operating relay PM1, which locks up through its No. 1 contacts over conductor 72 extending through sender-trunk connector 16 and within bracket 69 and conductor 203 to ground at the contacts of magnet PRT. The No. 2 contacts of relay PM1 remove the previously-mentioned ground from the brush of arc No. 2 of switch MTS and apply said ground to the winding of stepping magnet MST of switch MTS, thereby operating said stepping magnet. The removal of ground from the brush of arc No. 2 of switch MTS releases the print magnet PRT, which releases relay PMI, in turn releasing the stepping magnet MST, which advances the brushes of switch MTS to the No. 2 terminals. This again connects ground over the above-traced path through terminal No. 2 of arc No. 2 of switch MTS to conductor 70 to cause a repetition of the cycle of operations described, printing a second asterisk on the tape. The two asterisks denote the start of a ticket.

Ground, reapplied to the brush of arc No. 2 of switch MTS by the release of relay PMI at the completion of the operations described above, is carried through terminal No. 3 of said arc over conductor 73, within bracket 65, through the operated cross-point of register OB to one of the ten conductors 74 (only two of which are shown, the others being indicated) the particular conductor depending upon the cross-point of register OB which has been closed. The ten conductors 74 within bracket 65 are connected respectively to ten conductors 210 extended through the sender-trunk connector 16 and within bracket 69 to segments of commutator COM of the printing device corresponding to the ten digits 0 to 9 on the print wheel. When the rotating arm ARM of the printing device reaches the segment to which said grounded conductor is connected, the ground on said conductor causes the operation of print magnet PRT thereby printing on the tape a digit corresponding to the operated cross-point of register OB, subsequent to which by the operation of magnet PRT, the brushes of switch MTS are advanced to the No. 4 terminals in the manner already described.

The above operations, as described, are repeated in connection with terminal No. 4 of switch MTS, conductor 75 within bracket 65, register OG, and one of the conductors 74, said conductor depending upon the setting of register OG, resulting in the printing on the tape of a second digit corresponding to the operated cross-point of register OG, after which the brushes of switch MTS are advanced to the No. 5 terminals in the manner described. The two digits thus printed are those which were registered on registers OB and OG by the closure of their respective cross-points in response to the called-office code received by the tandem sender from the subscriber's sender 5. The two digits identify the called office.

With the brushes of switch MTS on the No. 5 terminals, ground is carried over the previously traced path through terminal No. 5 of arc No. 2 of said switch to conductor 76. This conductor is connected through the sender-trunk connector 16 and within bracket 69 and conductor 201 to the segment of commutator COM of the printing device which corresponds to a dash on the print wheel. When the arm ARM reaches said segment, ground on said conductor causes a repetition of the printing cycle, as previously described, thereby printing a dash on the tape and advancing the brushes of switch MTS to the No. 6 terminals.

At each of the terminals Nos. 6, 7, 8 and 9 of switch MTS, the printing cycle described is repeated, in connection with registers IB, IG, FB, FT and FU respectively and the four digits of the called line number, as determined by the operated cross-points of said registers, are printed on the tape, the brushes of switch MTS being advanced one terminal after each printing operation. At terminal No. 10 of switch MTS, a dash is printed since conductor 76, connected to the dash segment of commutator COM, is multipled to terminal 10 of arc No. 2 of switch MTS. The brushes of switch MTS are then advanced to the No. 11 terminals.

With the brushes of switch MTS at terminal No. 11, ground is supplied from the No. 3 contacts of relay TC01, through No. 2 normal contacts of relay PMI, the brush and No. 11 terminal of arc No. 2 of switch MTS, conductor 77, extended through the sender-trunk connector 16, and within bracket 69, to the winding of the "cut" magnet CUT, which operates to cut off any ticket previously printed on the tape. Operation of cut magnet CUT applies ground through its contacts to conductor 71, thereby causing the operation of relay PMI. Operation of relay PMI causes the operation of magnet MST and the subsequent release of said relay and said magnet advances the brushes of switch MTS, in the manner previously described, to terminals No. 12. A circuit is then completed from ground over the previously-traced path to the brush of arc No. 2 of switch MTS, through terminal No. 12 of that arc, conductor 78, resistance TCSR in parallel with the winding of relay TC01, conductor 67, extended through the sender-trunk connector 16, No. 2 contacts of relay E and No. 2 back contacts of off-normal contacts DON to battery through the winding of the rotary magnet DROT of switch DS. The current through the winding of relay TC01 and resistance TCSR in parallel is sufficient to operate rotary magnet DROT which advances the brushes of switch DS to the No. 1 terminals, operating off-normal contacts DON. The opening of No. 2 contacts of off-normal contacts DON releases rotary magnet DROT and relay TC01. With the brushes of switch DS on the No. 1 terminals, a circuit is completed from battery through the winding of relay AT, conductor 79, extended through sender-trunk connector 16 and terminal No. 1 of arc No. 1 of switch DS, to ground on the brush of that arc, operating relay AT which locks up through its No. 1 contacts, and conductor 80 to ground at No. 3 contacts of relay ON1. The No. 3 contacts of relay AT open the circuit of relay S, releasing said relay, and the opening of No. 1 contacts of relay S disconnects battery from conductor 66 to the sender-trunk connector 16, causing the sender-trunk connector to disconnect the tandem sender from the trunk. Release of relay S also applies ground through the No. 2 contacts of said relay to the terminals (except terminal No. 1) of arc No. 1 of switch MTS. This ground, through the brush of arc No. 1 of said switch and the contacts of stepping magnet MST, completes a self-interrupting circuit for stepping magnet MST causing its repeated operation and release, which advances the brushes of switch MTS to the No. 1 terminals. The trunk is then ready for the recording of the calling-line information.

*Connection of calling-line register to trunk*

When the connection has been extended to the terminating office in the usual manner, the incoming link (not shown) at the terminating office connects, for an interval, reverse battery to ring conductor 82 and ground to tip conductor 81. A circuit is then completed from battery at the terminating office on ring conductor 82 extended through tandem office links 13 and within bracket 58, through the sender link and controller 11 and within bracket 83, No. 7 back contacts of relay OD1, conductor 84, No. 6 contacts of relay RV, conductor 85 within bracket 86, No. 2 back contact of relay CR1, No. 1 back contact of relay CR2, conductor 87, No. 1 front contact of relay FO3, conductor 88, No. 4 contacts of relay FO2, No. 5 contacts of relay FS1, contacts of relay BO, winding of relay STB, No. 4 front contacts of relay FS1, conductor 89, upper winding of polarized relay OF in parallel with resistance OFR, through No. 8 contacts of relay FS1 and conductor 90, conductor 91, No. 4 normal contact of relay AV2, No. 8 contacts of relay RR3, conductor 92, within bracket 86, No. 3 contacts of relay RV, conductor 93, No. 5 back contact of relay OD1, conductor 81, within bracket 83, extended through the sender link and controller 11, within bracket 58 and through tandem office links 13 to ground at the terminating office on tip conductor 81. Relays STB and OF operate over this path. Relay OF locks up through its lower winding over a circuit extending from ground on its own contacts through conductor 94, No. 1 contacts of relay RV1, conductor 95, lower winding of relay OF and conductor 96, to battery at No. 3 contacts of relay DST. Relay IA then operates from battery through its winding, No. 7 contacts of relay FS1, conductor 97, No. 1 front contact of relay S6, conductor 98 and conductor 94, to ground through contacts of relay OF. With relays STB and IA both operated, relay O operates over a circuit from battery through No. 4 contacts of relay DST, conductor 99, winding of relay O, conductor 100, No. 4 contacts of relay IA, conductor 101, No. 3 back contact of relay FS2, contacts of relay STB, to ground through No. 1 back contact of relay FS2. When relay STB releases on the termination of the connection of battery and ground to conductors 82 and 81, respectively, at the terminating office, the opening of its contacts removes the short-circuit around relays FO and BO and said relays operate in parallel and in series with relay O over conductor 102 through contacts of relay O and conductor 103 to ground at No. 2 contacts of relay FO3.

Operation of relay FO completes a circuit from battery on the winding of relay RB over conductor 104 through No. 5 contacts of relay L2, conductor 105, No. 1 front contact of relay IA, No. 1 back contact of relay OF1, contacts of relay FO, conductor 106, within bracket 86, No. 3 normal contacts of relay RB, and conductor 107, to ground at No. 2 contacts of relay ON2, operating relay RB which locks up to the same ground through its No. 3 front contact. Relay RV1 then operates from battery through its winding over conductor 108 to ground at No. 2 contacts of relay RB. Ground at No. 1 contacts of relay RB is then extended over conductor 109, No. 2 contacts of relay RV2, No. 1 back contacts of relay RV4, conductor 110, No. 4 back contact of relay C11, No. 5 normal contact of relay PA, No. 6 and No. 5 contacts of relay SA, No. 5 contacts of relay C11, No. 1 contacts of relay C12, No. 4 normal contacts of relay OD1, No. 3 back contact of relay RV7, conductor 111, No. 2 contacts of relay ON1, conductor 112 within bracket 83, extended through the sender link and controller 11 and within bracket 58, to the ring conductor 54 of the trunk. Ground at No. 3 contacts of relay RV3 is also extended through No. 4 front contact of relay RV1, No. 1 back contact of relay SP1, conductor 113, No. 2 back contact of relay C11, No. 4 normal contact of relay PA, No. 1 and No. 2 contacts of relay SA, No. 1 contacts of relay C11, No. 2 contacts of relay C12, No. 9 contacts of relay OD1, No. 1 back contact of relay RV7, conductor 114, No. 1 contacts of relay ON1, conductor 115 within bracket 83, extended through the sender link and controller 11, and within bracket 58, to the tip conductor 53 of the trunk. These grounds discharge any accumulated charge on the conductors of the trunk.

Operation of relay RV1 connects ground through its No. 3 contacts to the winding of relay RV2, causing the operation of this relay whose No. 2 contacts open the circuit previously traced which supplied ground to ring conductor 54 of the trunk. Relay RV2 is a slow-operate relay so that ground is maintained on ring conductor 54 for an appreciable interval. Operation of relay RV1 also completes a circuit from battery on the winding of relay L in parallel with resistance RR4, over conductor 116, through No. 1 contacts of relay RV3, No. 5 back contacts of relay SB1, No. 2 front contact of relay RV1, conductors 117 and 110, No. 4 back contact of relay C11, No. 5 normal contact of relay PA, No. 6 and No. 5 contacts of relay SA, No. 5 contacts of relay C11, No. 1 contacts of relay C12, No. 4 normal contact of relay OD1, No. 3 back contact of relay RV7, conductor 111, No. 2 contacts of relay ON1, conductor 112 within bracket 83, extended through sender link and controller 11, and within bracket 58, conductor 54, No. 2 back contact of relay TR, No. 4 back contact of relay TC1, winding of polarized relay P, No. 3 back contact of relay TC1, conductor 56 extended through office link switches 9 and 8, district link switches 7 and 6, conductor 52, extended through sender-link 4 and joined in subscriber's sender 5 to conductor 51, extended through sender-link 4, conductor 55 extended through district link switches 6 and 7 and office link switches 8 and 9, No. 2 and No. 1 back contacts of relay TC1, No. 1 back contact of relay TR, conductor 53 within bracket 58, extended through the sender link and controller 11 and within bracket 83, conductor 115, No. 1 contacts of relay ON1, conductor 114, No. 1 back contact of relay RV7, No. 9 contacts of relay OD1, No. 2 contacts of relay C12, No. 1 contacts of relay C11, No. 2 and No. 1 back contacts of relay SA, No. 4 normal contacts of relay PA, No. 2 back contact of relay C11, conductor 113, No. 1 back contact of relay SP1, No. 4 front contact of relay RV1, to ground at No. 3 contacts of relay RV3. The polarized relay P included in this circuit is so poled that it does not respond to the impulses transmitted over the trunk during the registration of the called-line information in the tandem sender, but when ground is removed from ring conductor 54 by the operation of relay RV2, as described above, relay P operates over the above-traced circuit, in turn operating relay P1, which locks up through its No. 2 contacts, the winding of relay TC1, conductor 118 extended through office link switches 9 and 8 and district link switches 7 and 6, to ground at contacts of relay SR, relay TC1 also operating. Operation of relay TC1 completes a circuit from battery through the lower winding of relay A, the lower right-hand winding of coil C, No. 3 from contact of relay TC1, conductor 56 extended through office link switches 9 and 8 and district link switches 7 and 6, No. 2 contacts of relay OT (which was operated by the marker and locked to relay T), No. 2 contacts of relay T, conductor 120 extended through line link switches 3 and 2, switchhook contacts of station 1, conductor 119, extended through line link switches 2 and 3, No. 1 contacts of relay T, No. 1 contacts of relay OT, conductor 55 extended through district link switches 6 and 7 and office link switches 8 and 9, No. 2 front contact of relay TC1, the upper right-hand winding of coil C, and the upper winding of relay A to ground, operating relay A, which completes an obvious circuit for relay B. Relay B operates and at its No. 1 contacts, grounds the sleeve conductor 118 through the left-hand winding of transformer TNS.

When the subscriber's sender 5 has completed its functions, it is disconnected by sender link 4, releasing relay SR which removes ground at its contacts from sleeve conductor 118. The connection of the calling-station to the trunk is then under the control of the calling-station through relay A which controls relay B.

Figure 2:
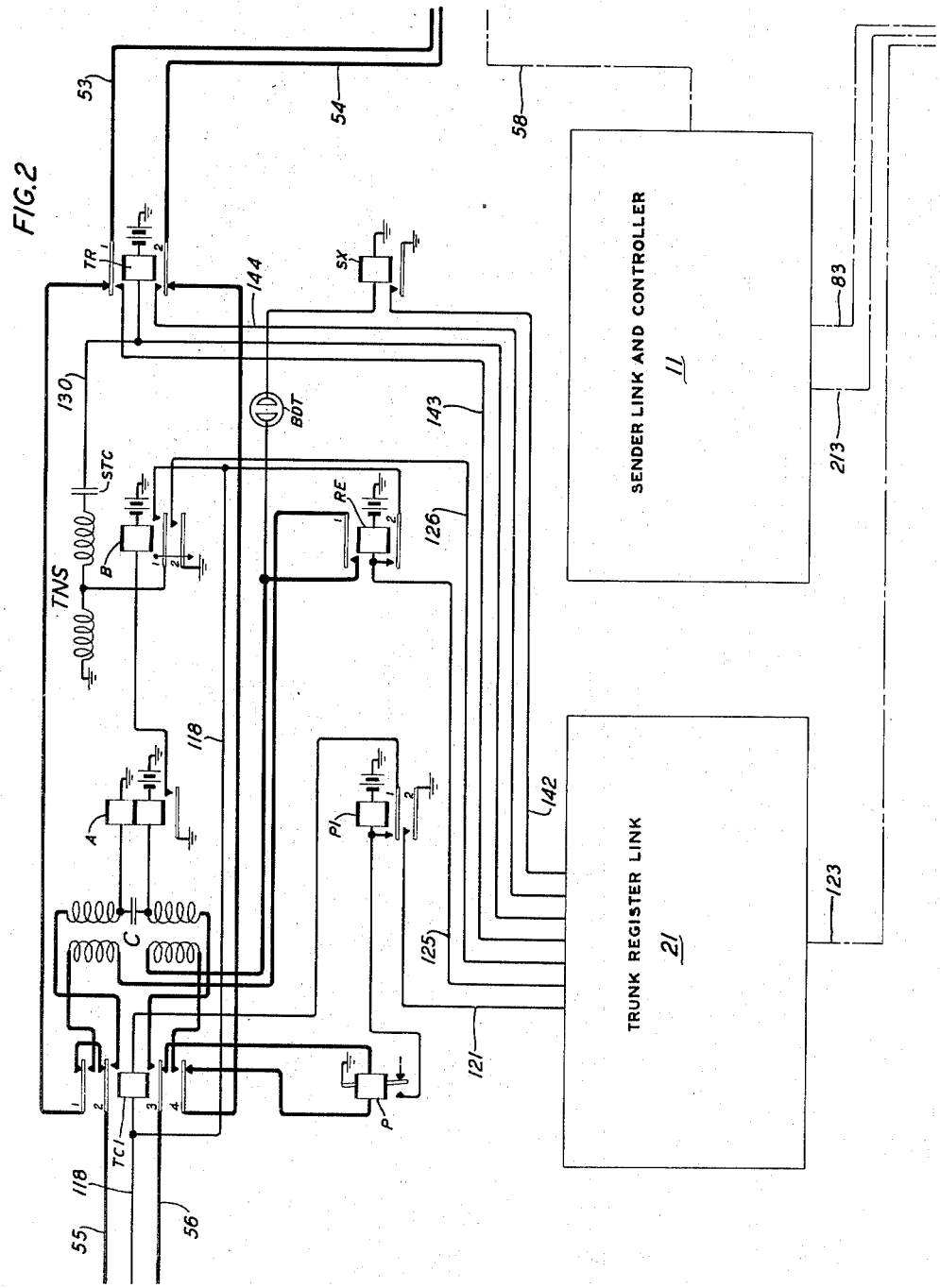
Fig. 2 shows the circuit of the outgoing end of the trunk at the local central office.
Figure 3:
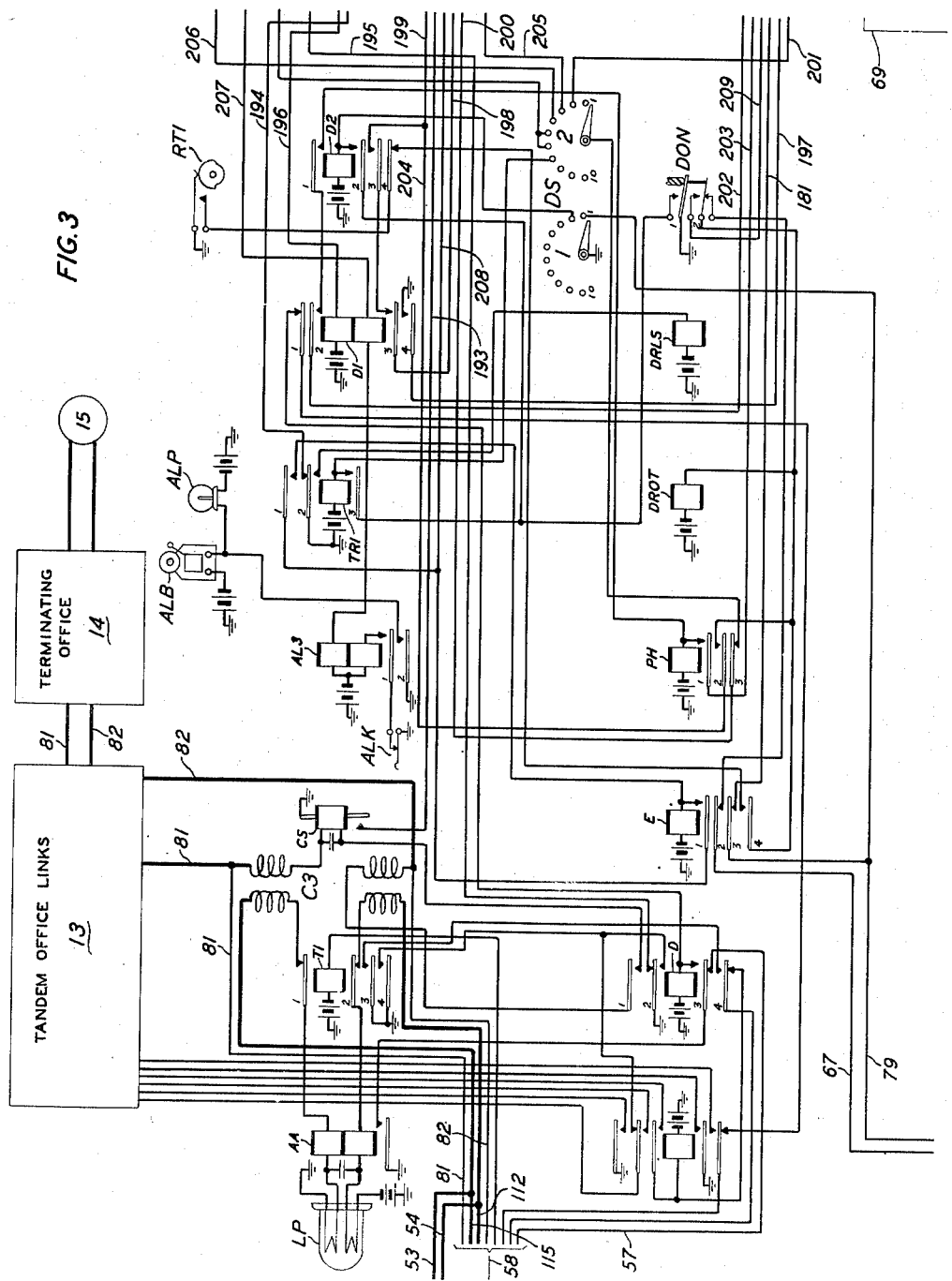
Figs. 3 and 4 show the circuit of the incoming end of the trunk at the tandem office including the recording and timing devices.
Figure 7:
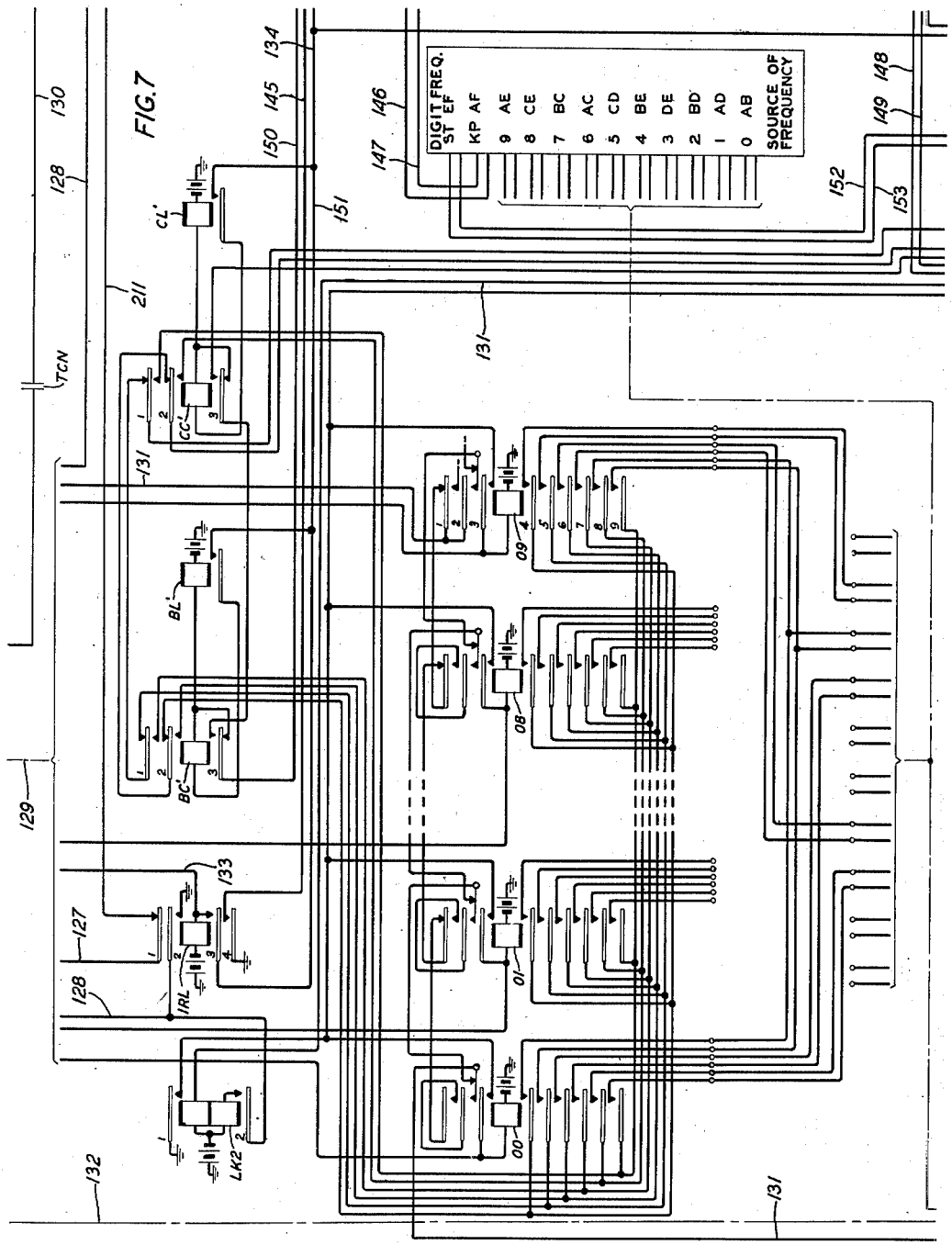
Figs. 7, 8 and 13 show the circuit of the register.
Figure 8:
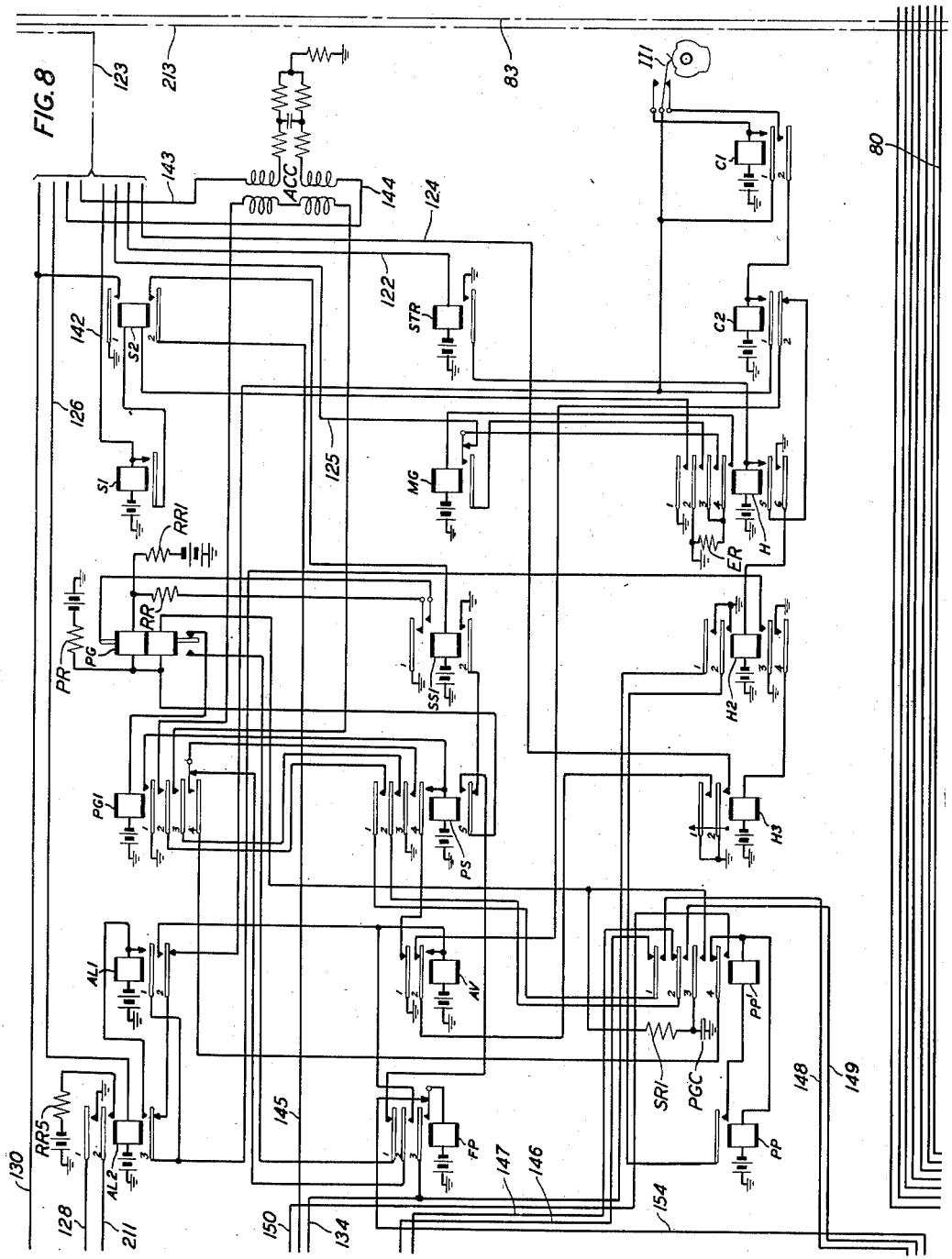
Figure 9:
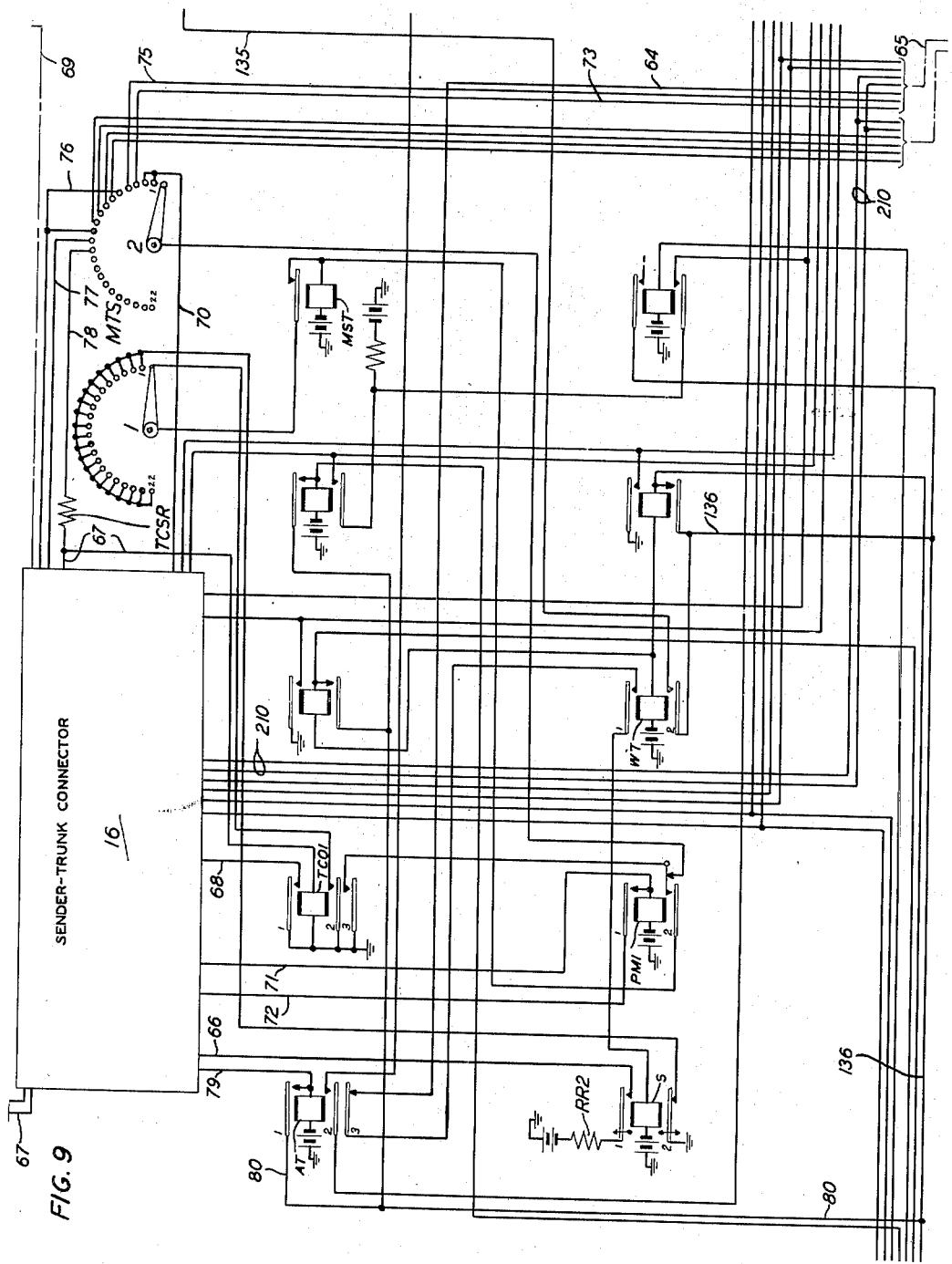
Figure 10:
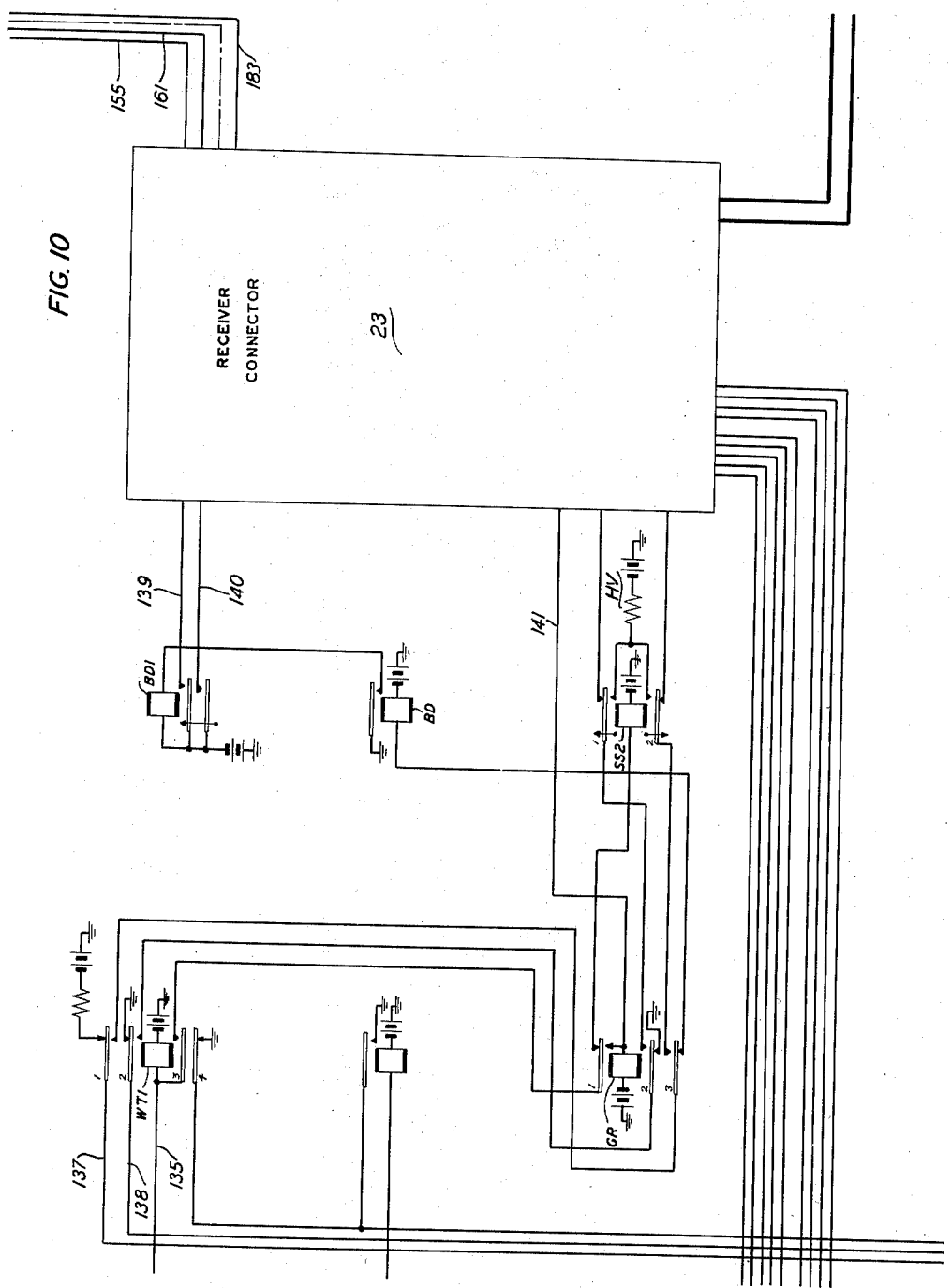
Figure 11:
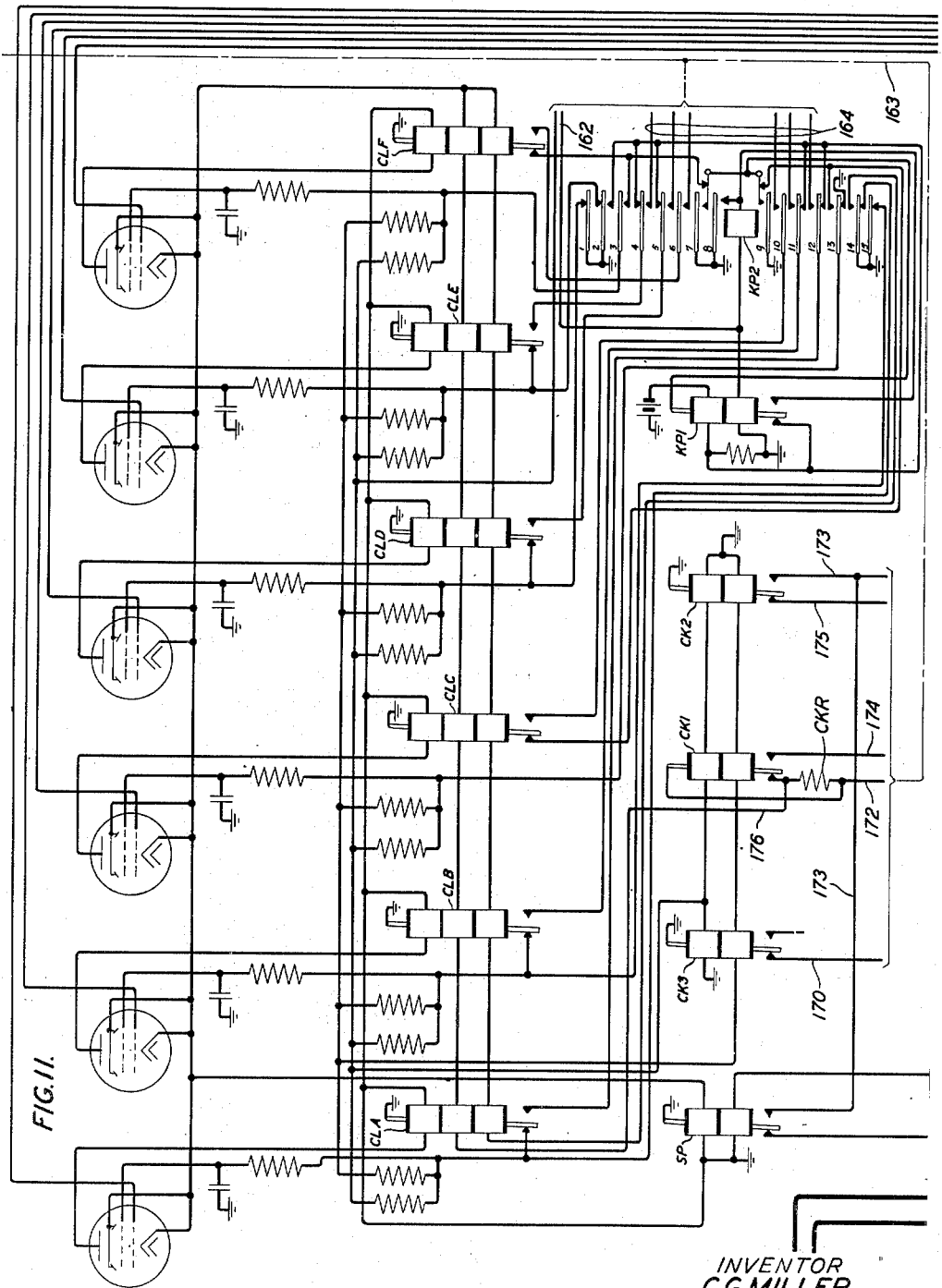
Figure 12:
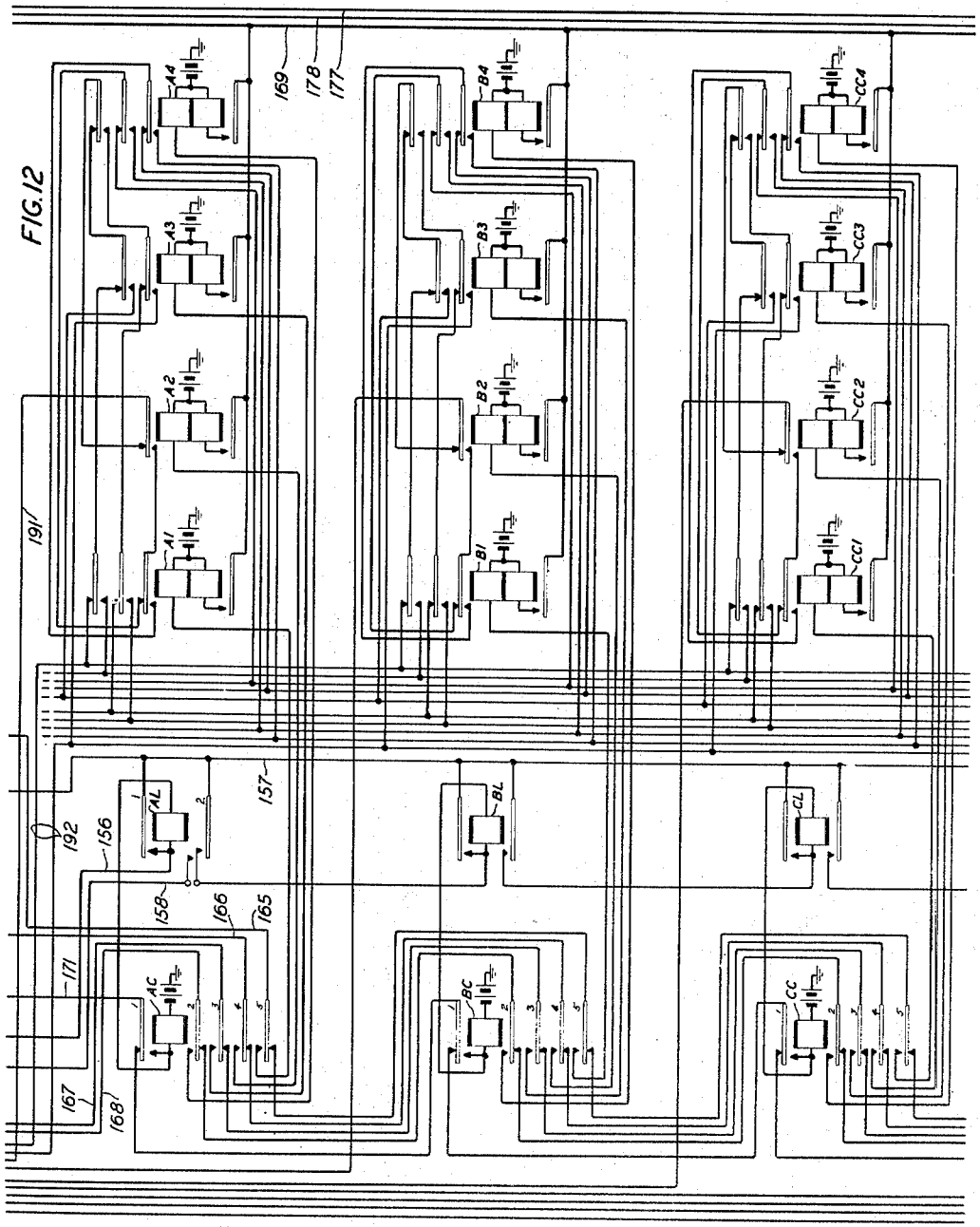
Figure 13:
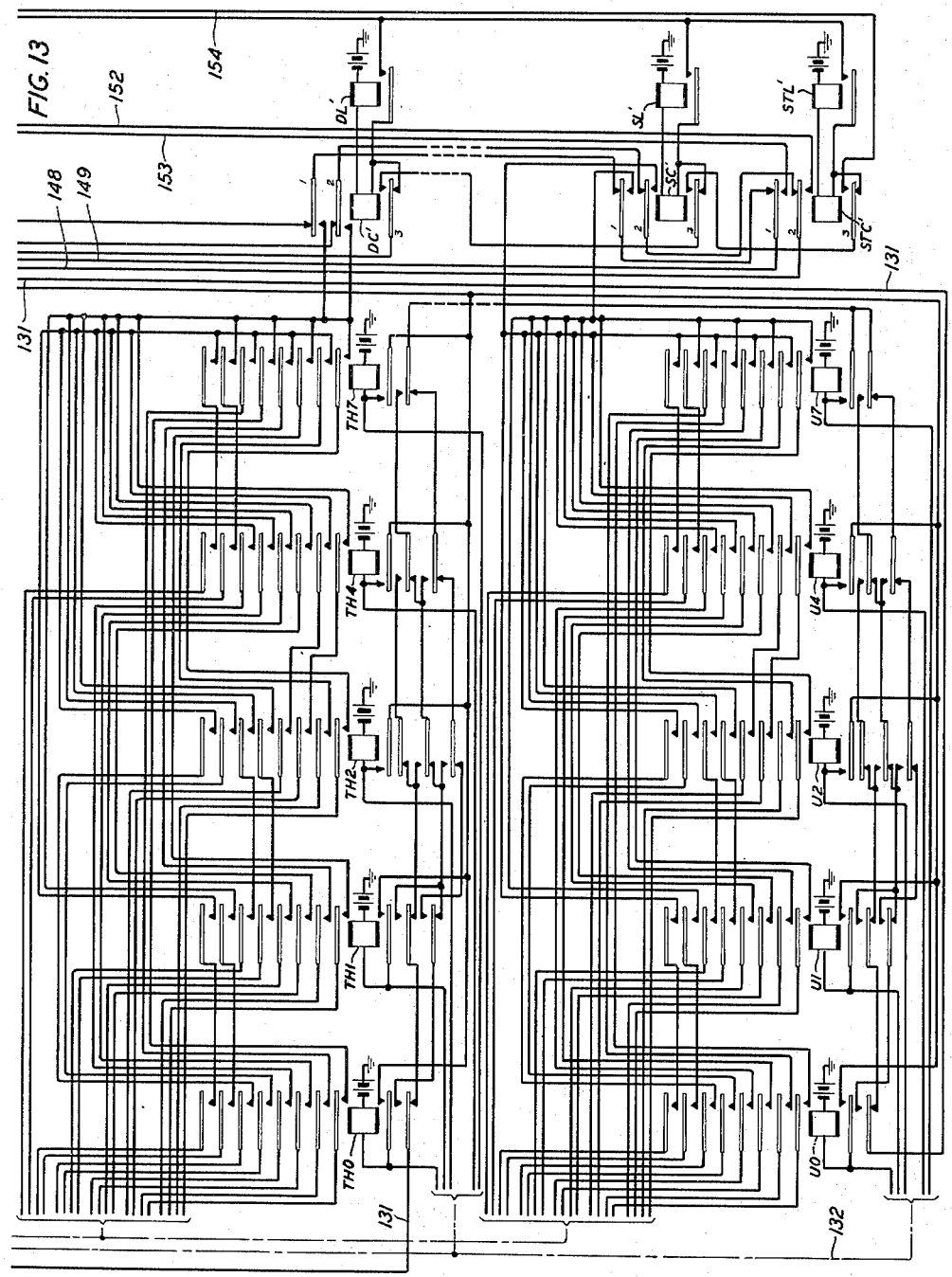
Figure 14:
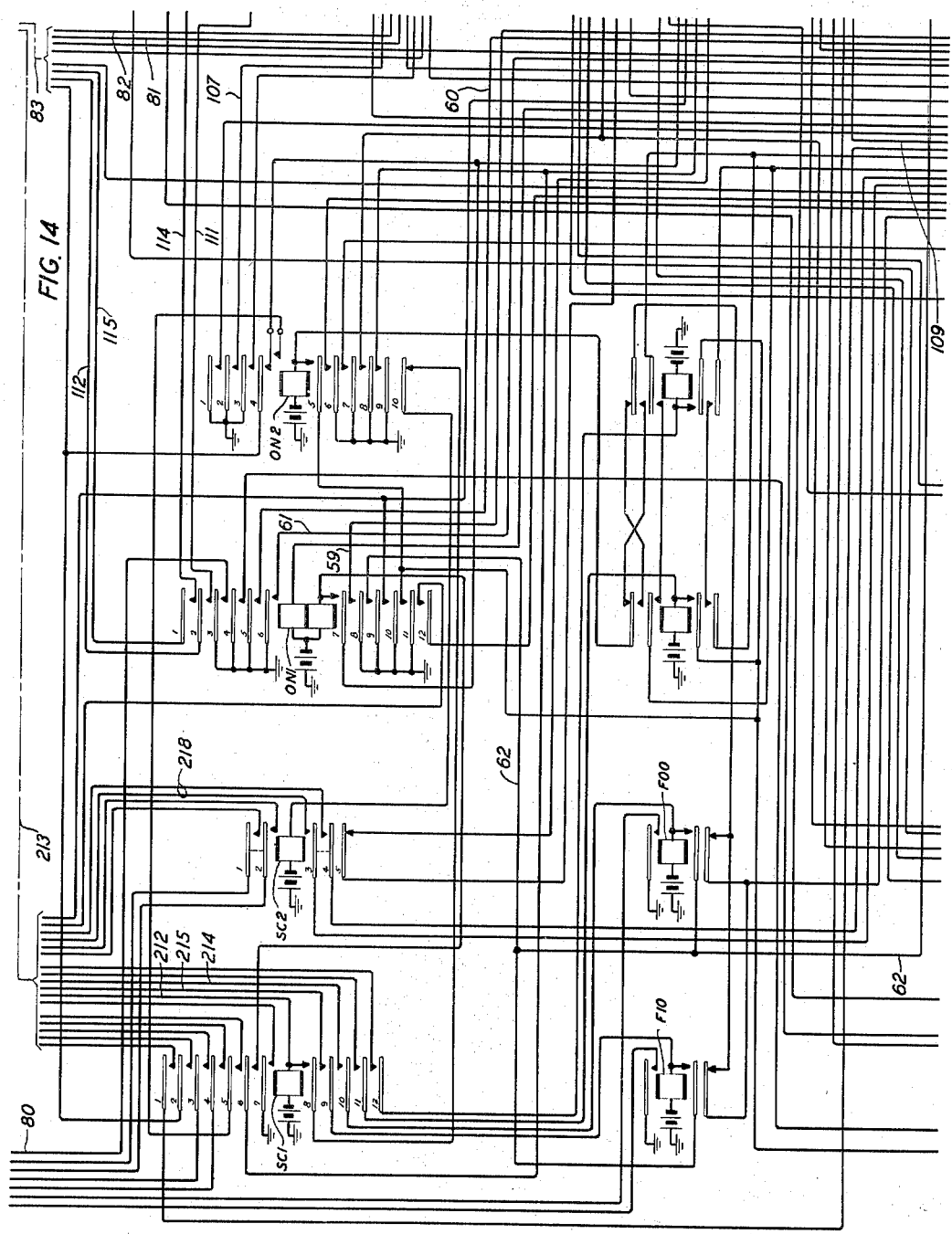
Figure 15:
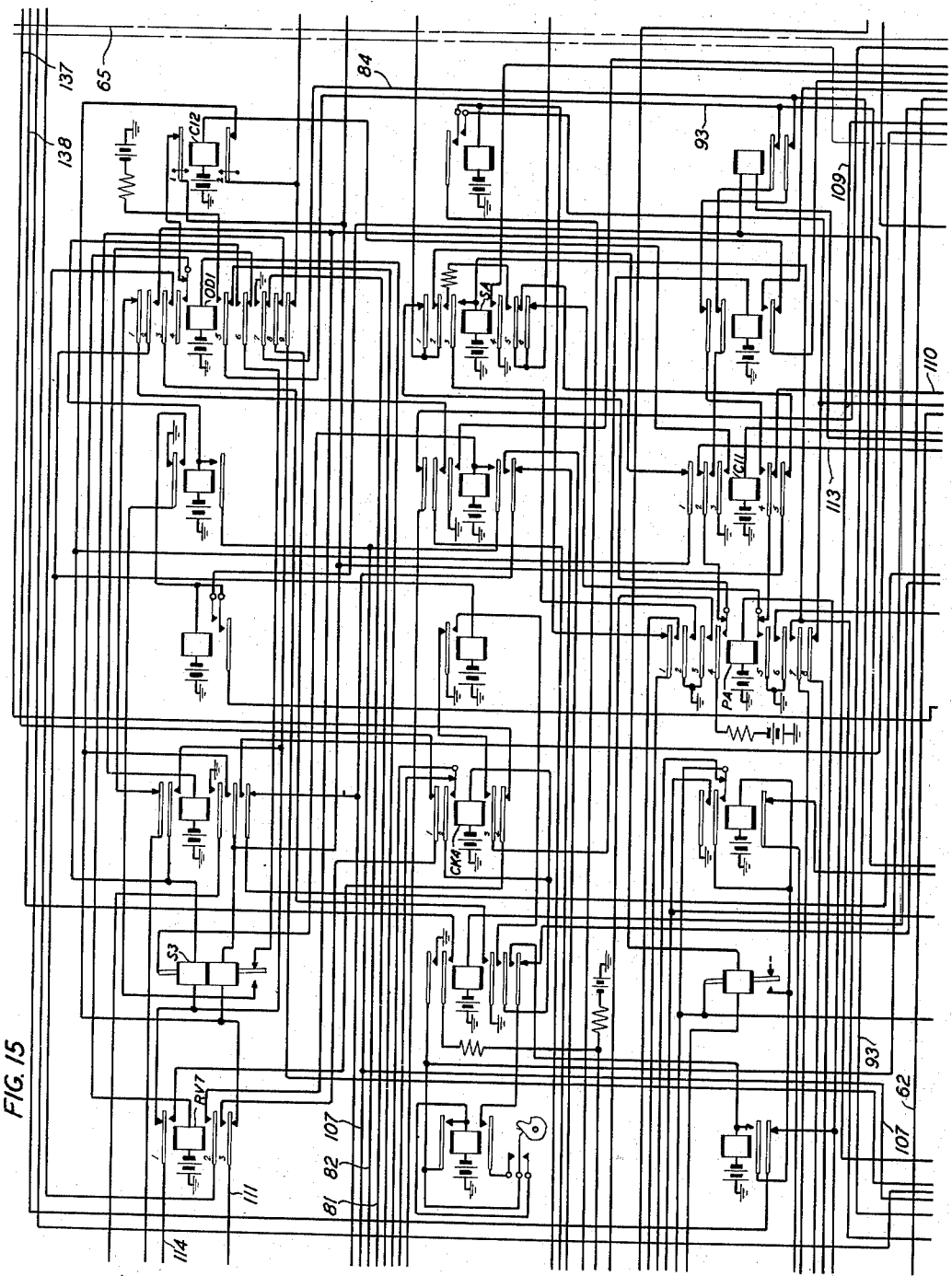
Figure 16:
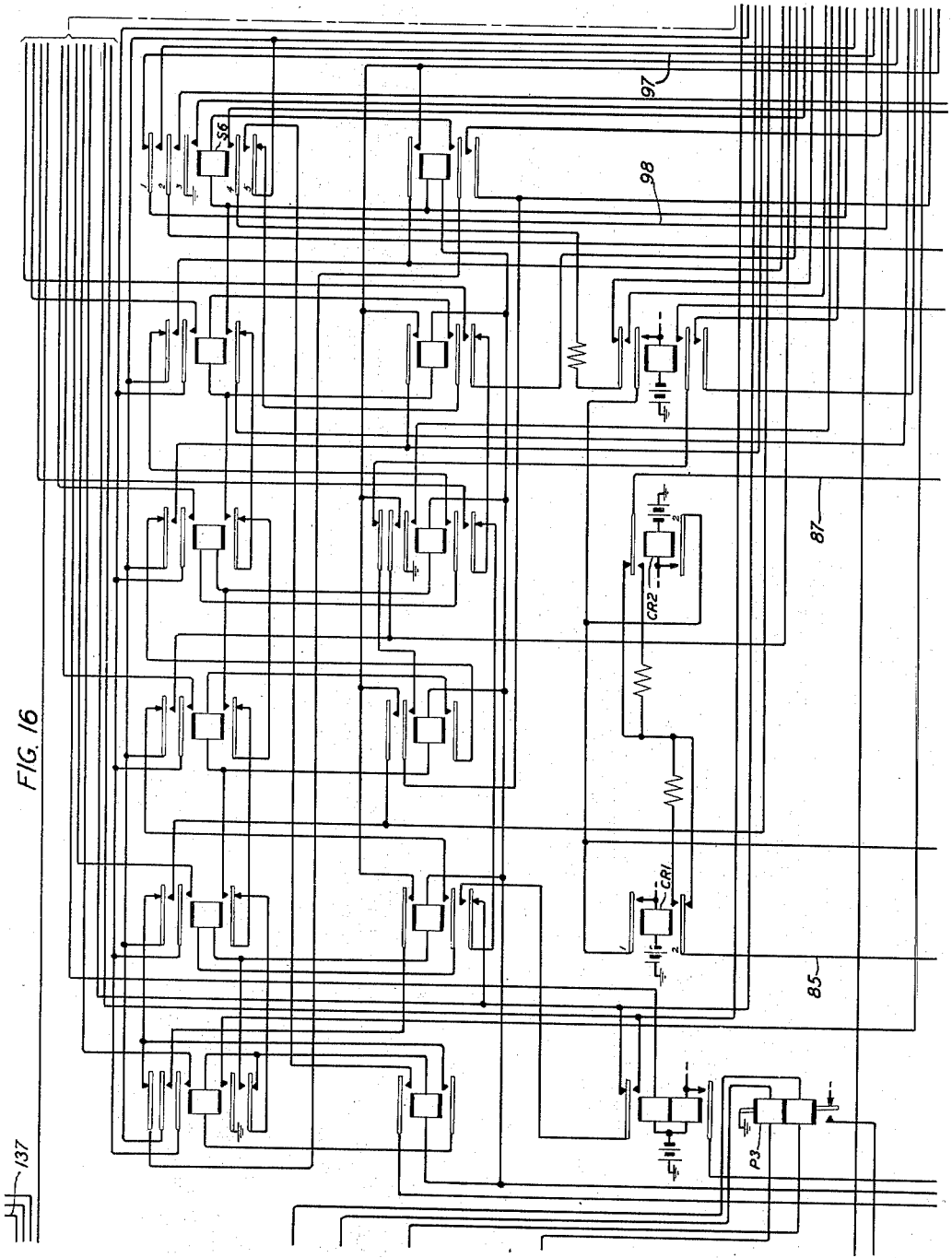
Figure 17:
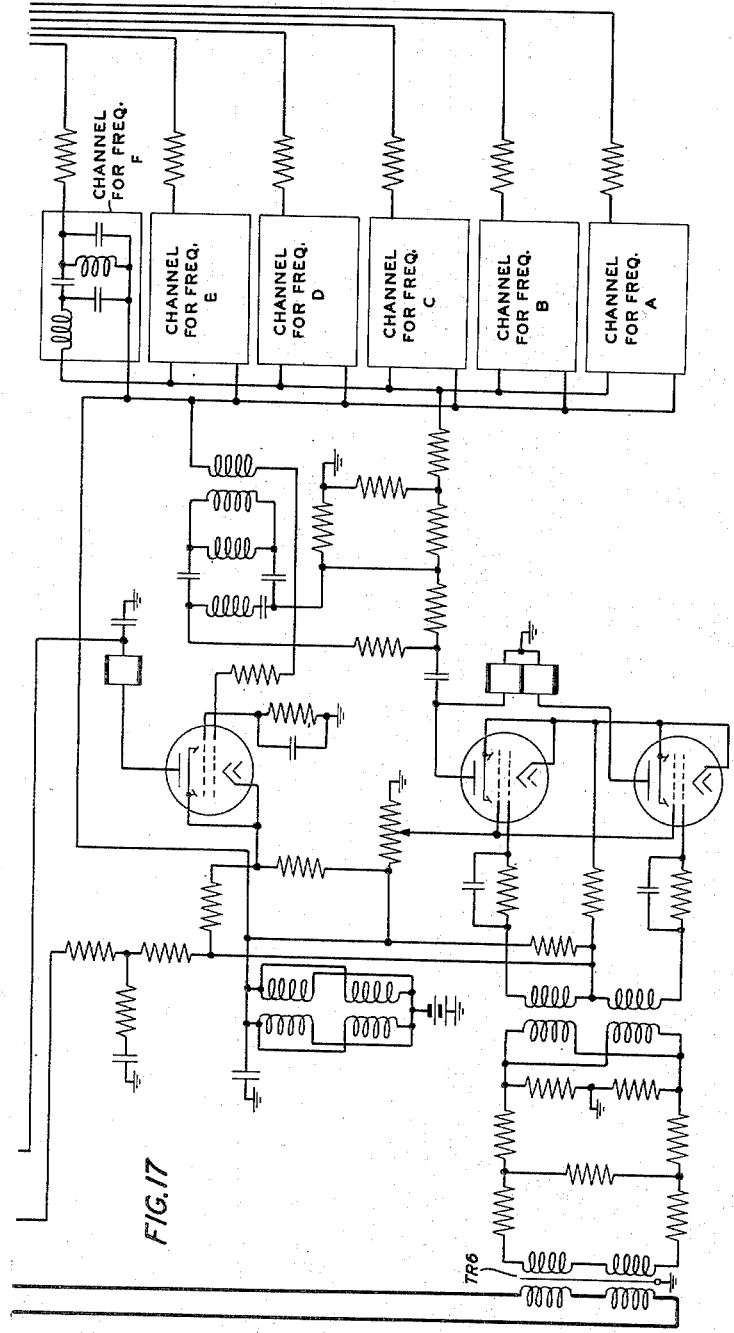
Figure 18:
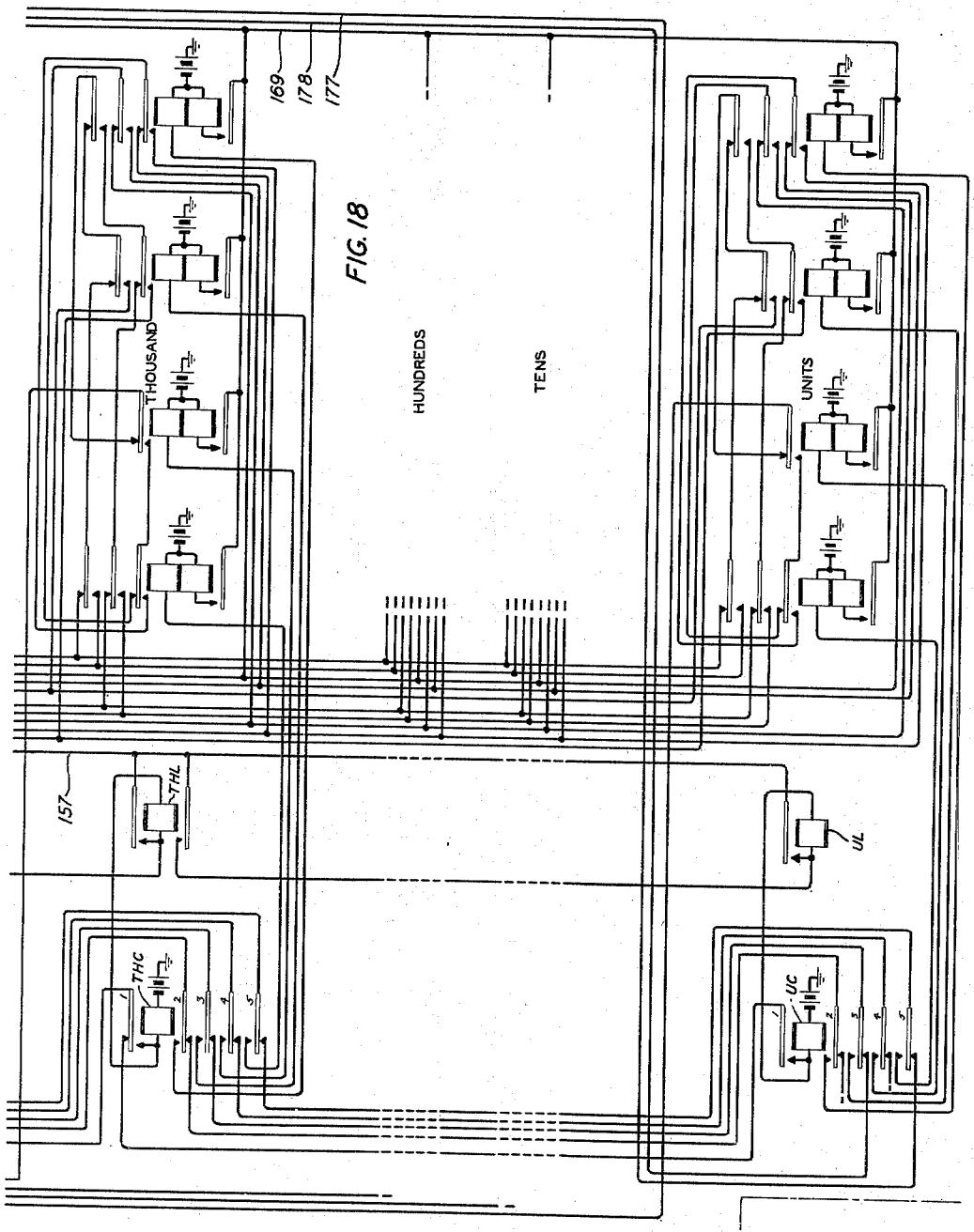
Figure 19:
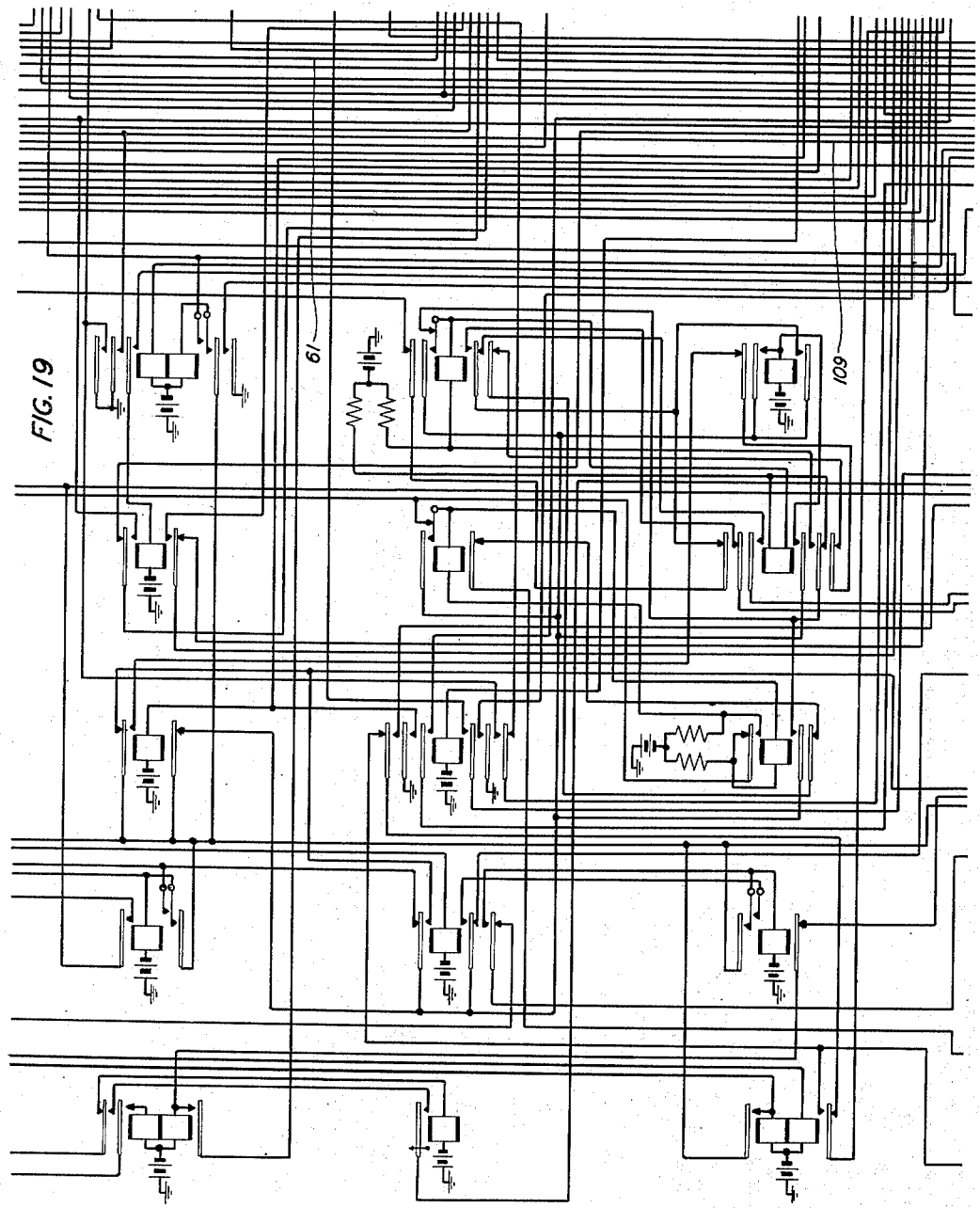
Figure 20:
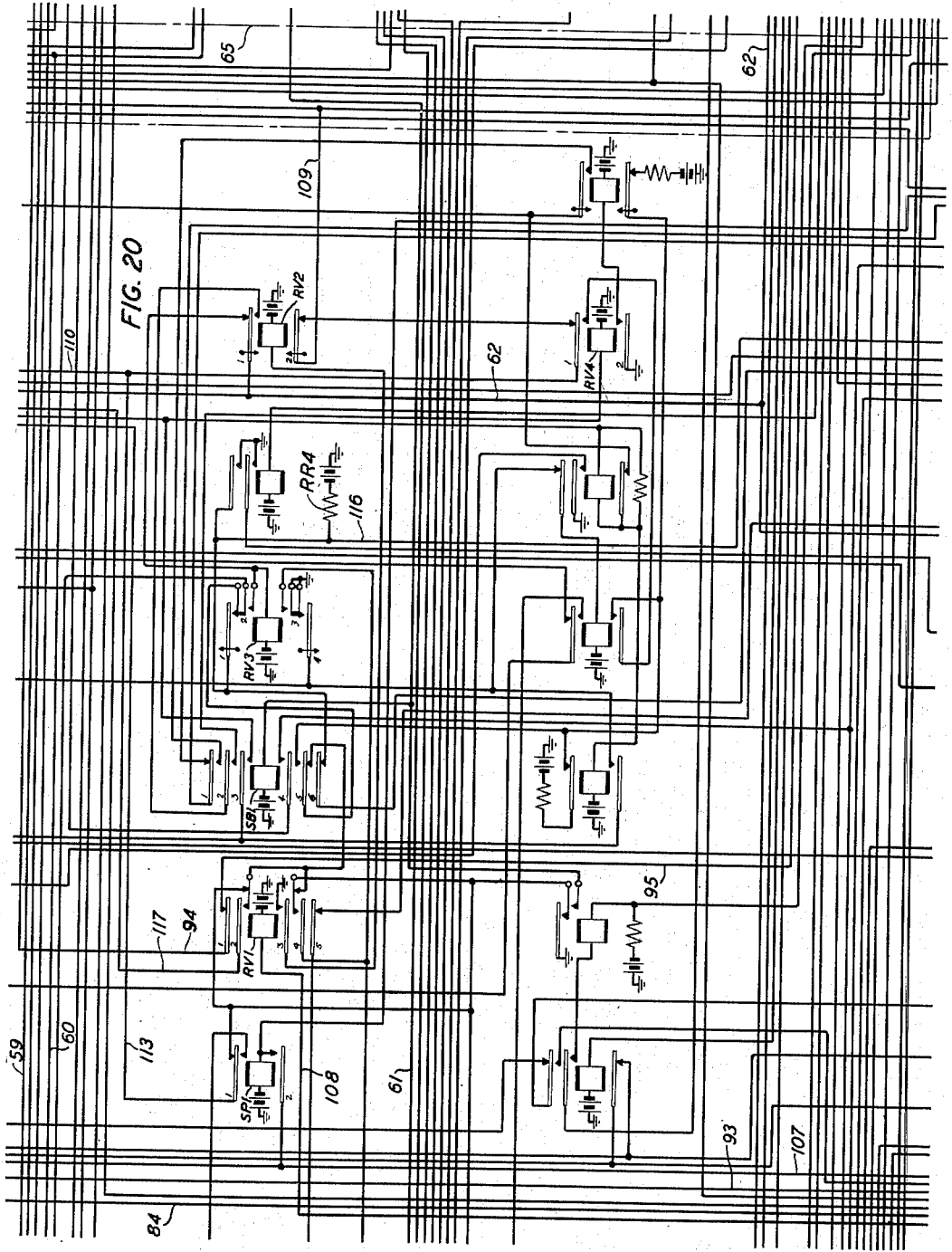
Figure 21:
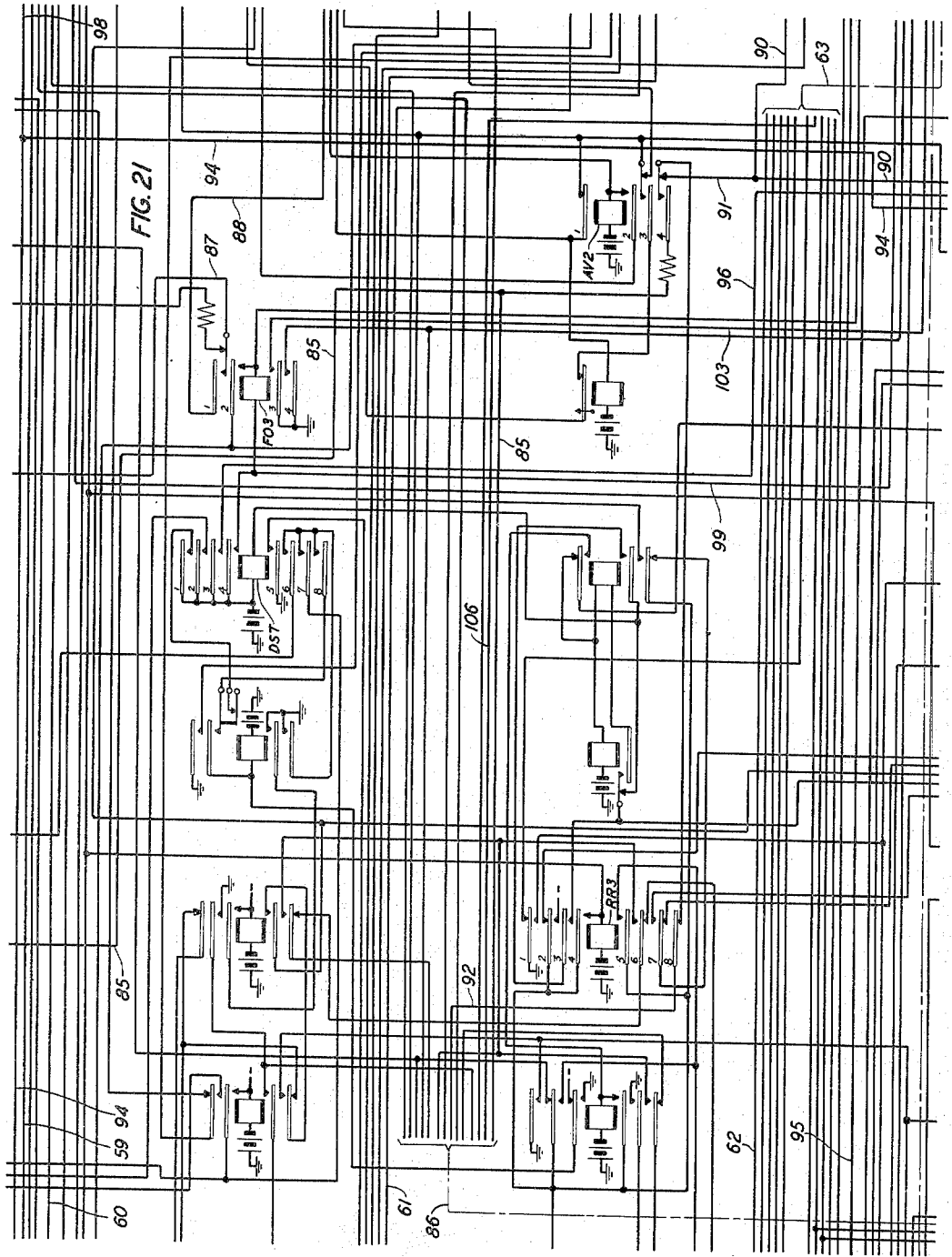
Figure 22:
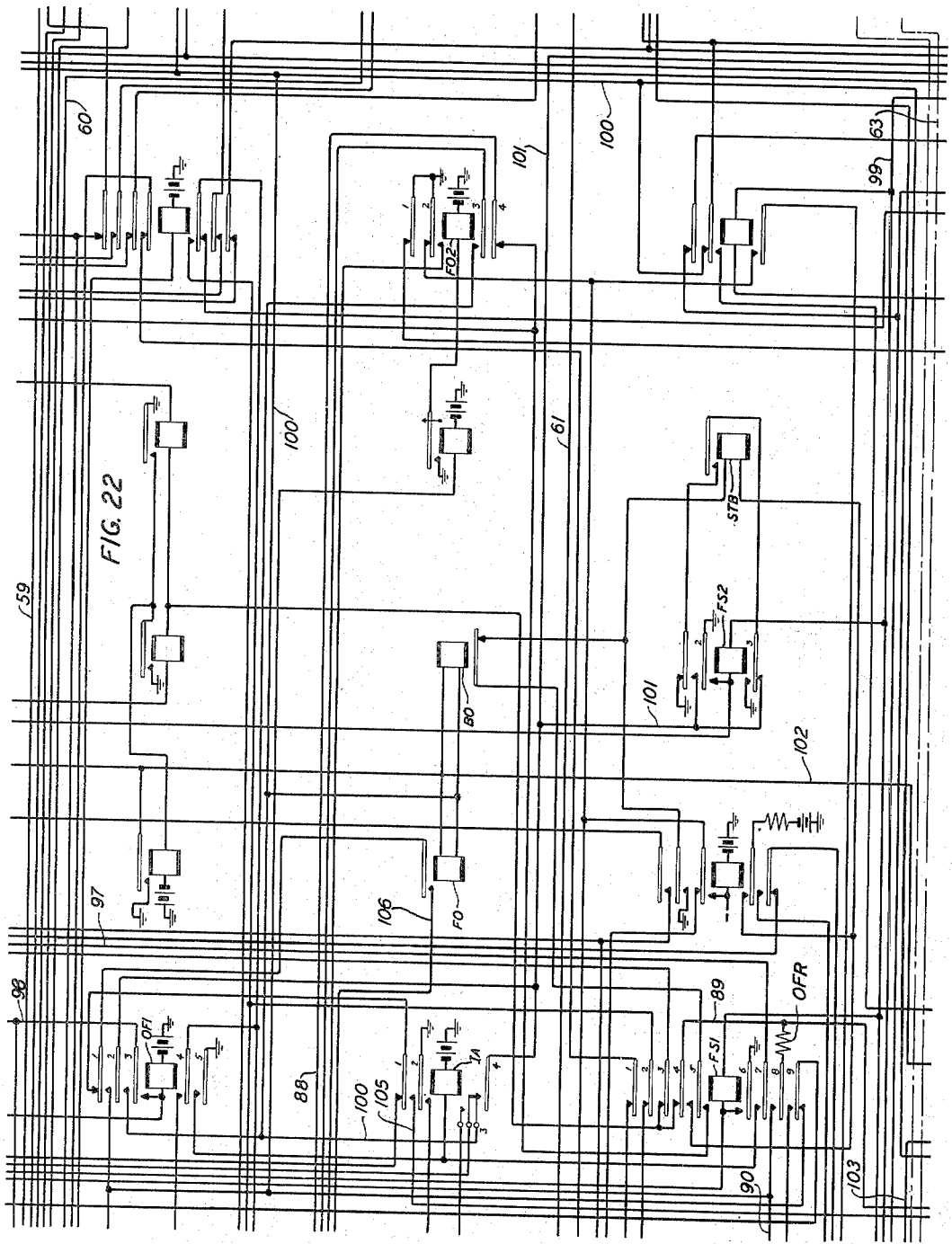
Figure 23:
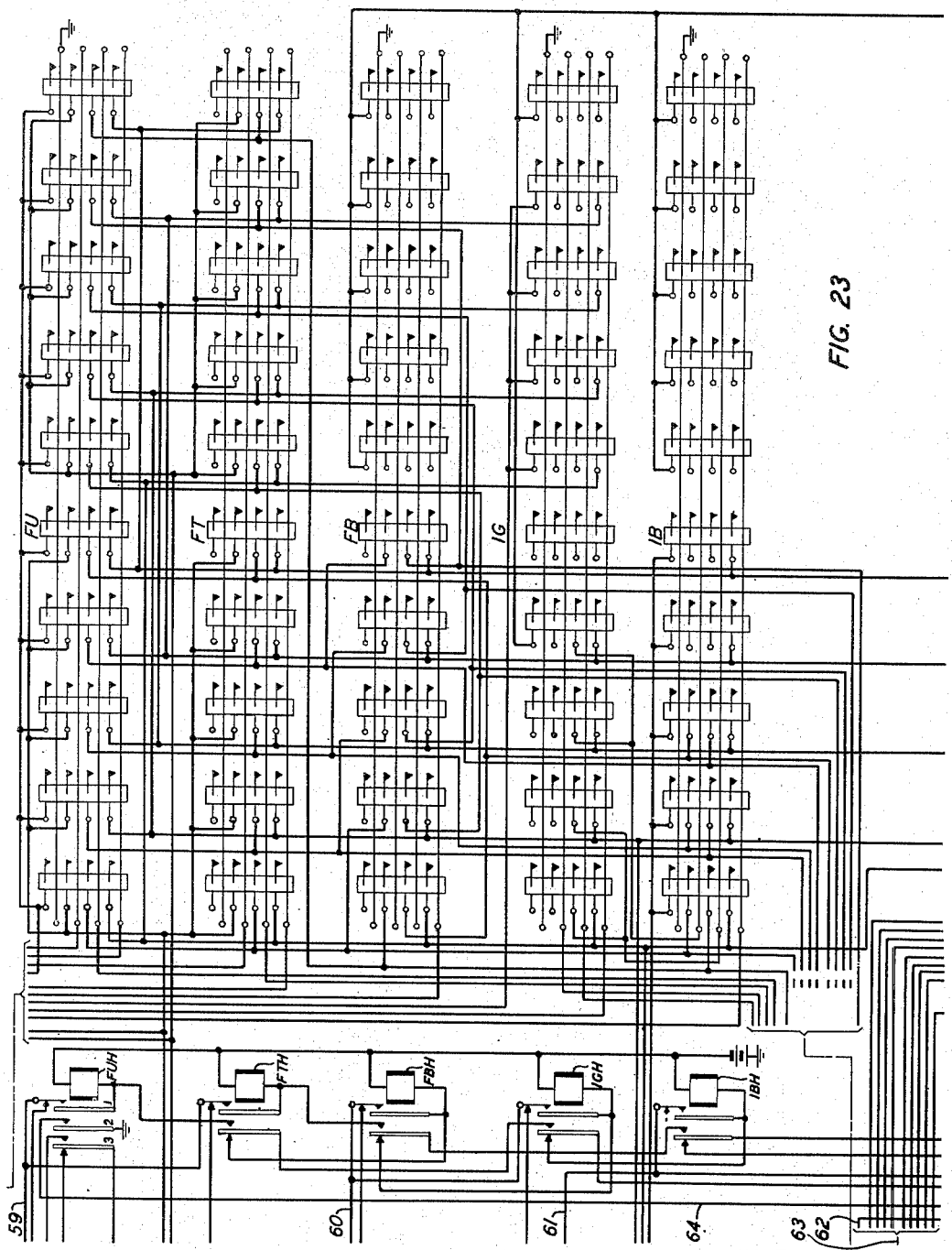
Figure 24:
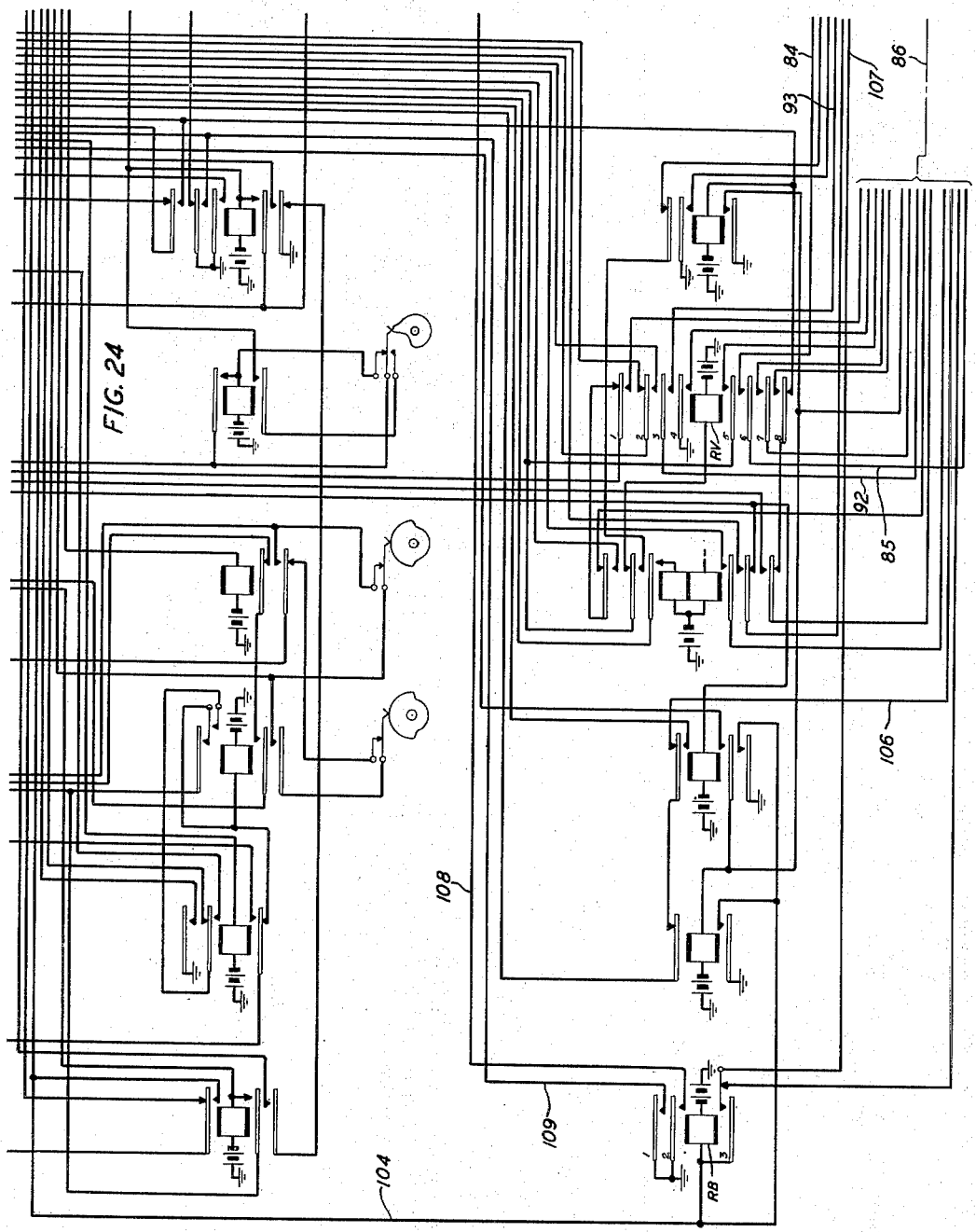
Figure 25:
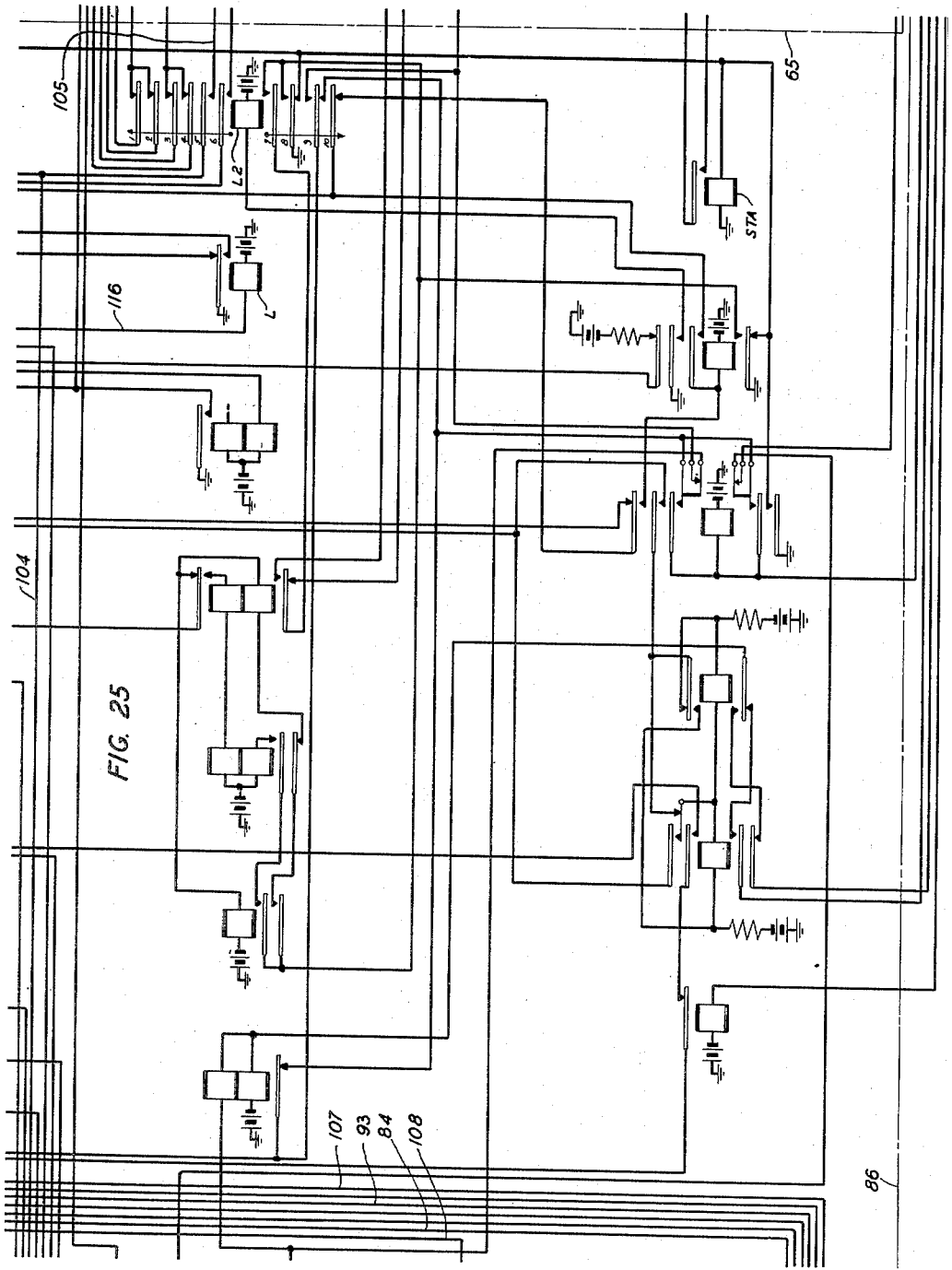
Figure 26:
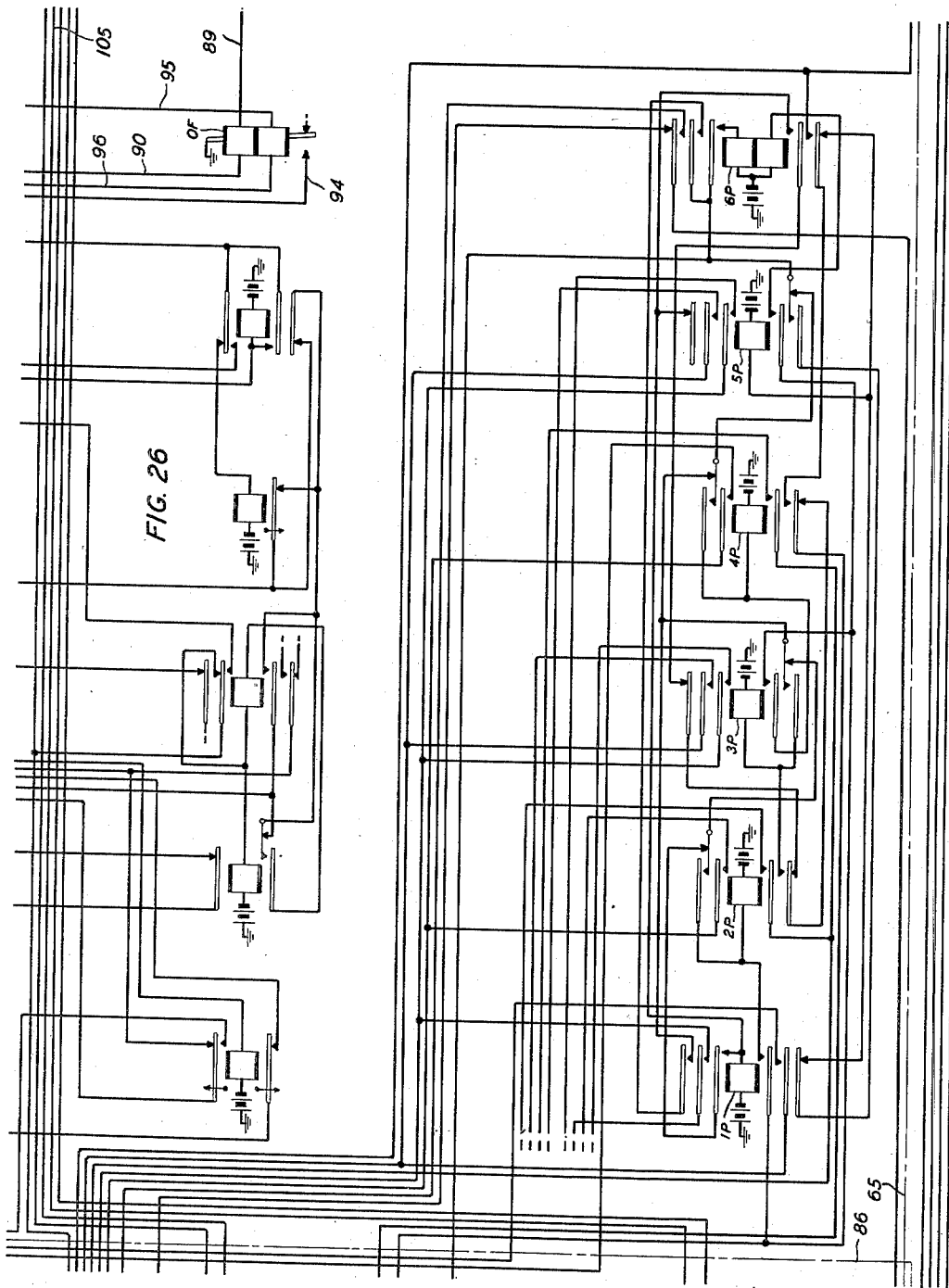
Figure 27:
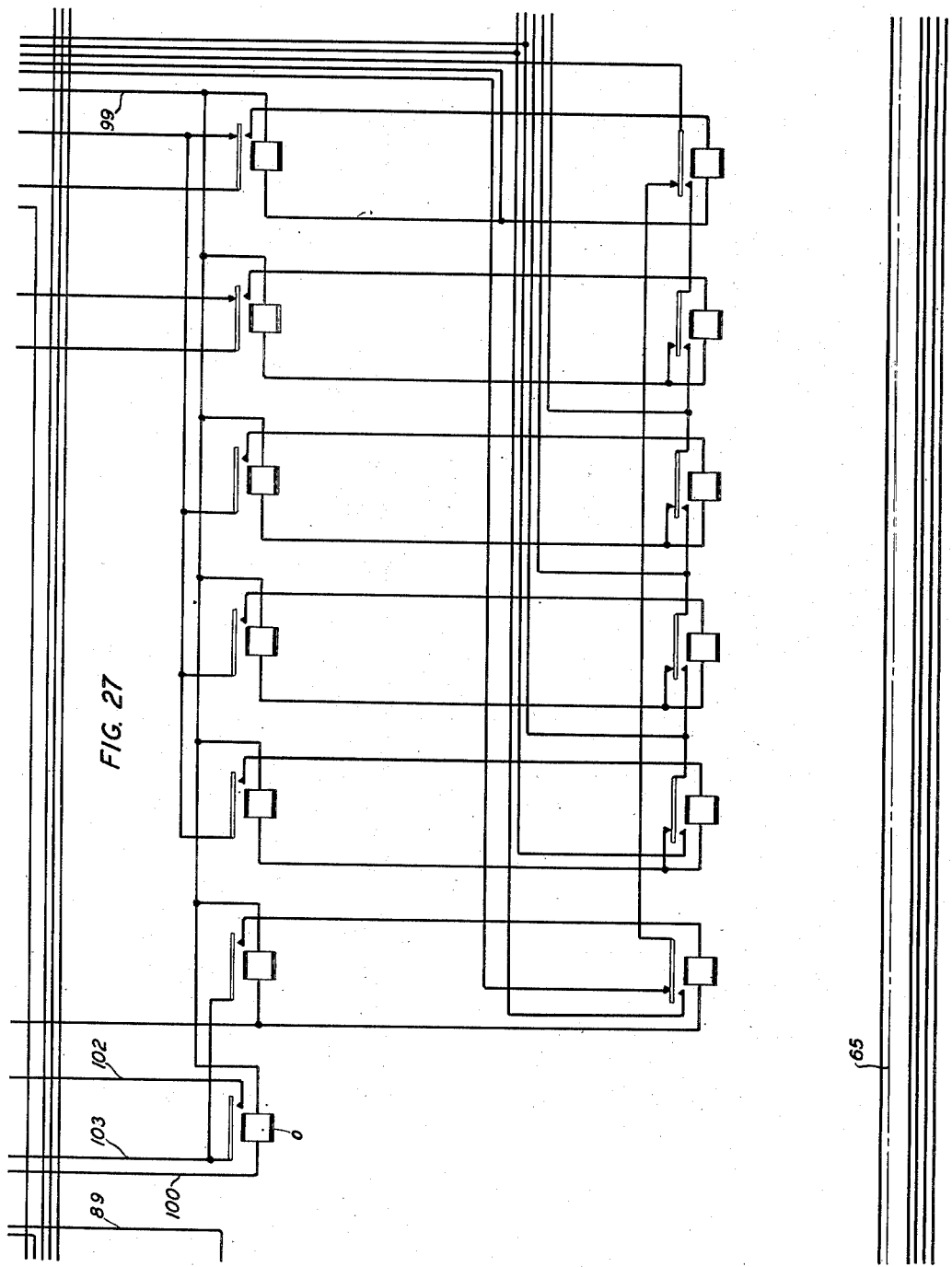
Figure 28:
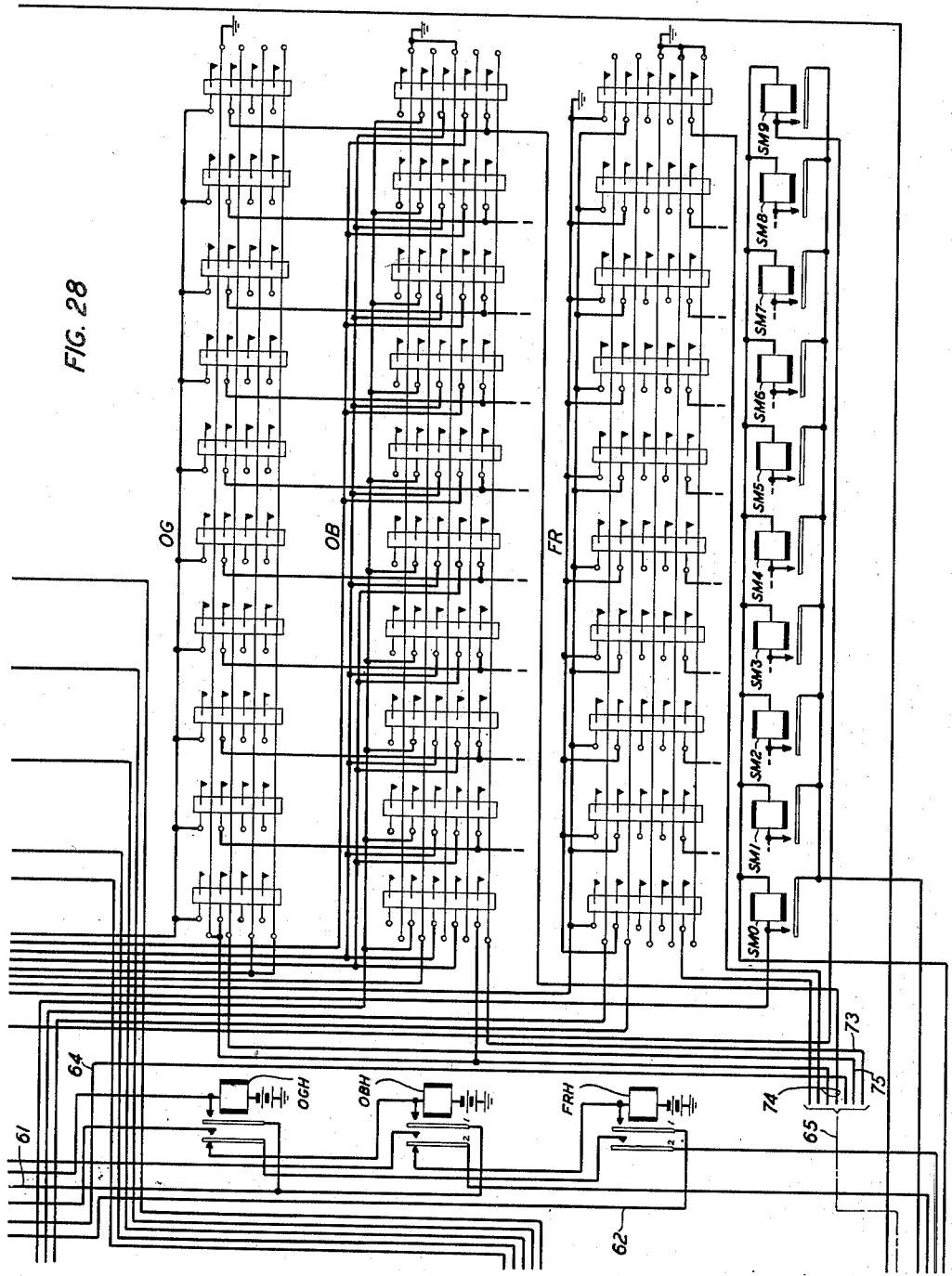

Operation of relay P1 connects ground, through its No. 2 contacts, to conductor 121 to the trunk-register link 21, indicated but not shown in Fig. 2, causing the trunk-register link to select an idle register, such as is shown in Figs. 7, 8 and 13, to the trunk. The trunk-register link used in the present embodiment of this invention is similar to the sender link and control circuit used in the cross bar system for associating an idle sender with a calling trunk and is described in the Patent No. 2,224,251 granted to A. J. Busch and E. L. Erwin on December 10, 1940, to which reference is made for an understanding of its construction and operation.

When the register has been connected to the trunk, the trunk-register link 21 grounds conductor 122 within bracket 123, thereby operating relay STR and in consequence thereof, relays H, H2 and H3 in the sequence indicated. Relay H locks up through its No. 5 contacts, No. 2 contacts of relay C2, and No. 2 contacts of relay AV to ground at No. 1 contacts of relay H3, holding relays H2 and H3 also operated. Relay H3, through its No. 2 contacts, grounds conductor 124 within bracket 123 to the trunk-register link 21, thereby making the register test busy during the remainder of its operation, and ground on conductor 124 causes the trunk-register link 21 to remove ground from conductor 122, releasing relay STR. Relay H, through its No. 3 contacts and the normal contact of relay MG grounds, through resistance ER, conductor 125 within bracket 123 extended through the trunk-register link 21, operating relay RE, which locks up through its No. 2 contacts, and No. 1 contacts of relay B to ground through the lower winding of transformer TNS. The No. 1 contacts of relay RE close the circuit between the two left-hand windings of coil C, thereby closing through the trunk to the tandem office. The winding of relay MG is connected to ground through resistance ER by the No. 4 contacts of relay H but the resistance is sufficient to prevent relay MG from operating. However, the winding of relay MG is also connected to the aforesaid ground on conductor 125 through No. 4 and No. 3 contacts of relay H, operating relay MG which disconnects through resistance ER from conductor 125 and locks up through No. 4 and No. 3 contacts of relay H, its own front contact and No. 2 contacts of relay H.

Should the register have been selected before relay B has operated, indicating that the trunk is not ready for the connection of the register, ground will be supplied from No. 3 contacts of relay H2 through No. 3 back contact of relay AL2 and No. 2 back contact of relay AL1 to the swinger of interrupter II1, which runs continuously. Closure of the upper contact of interrupter II1 applies this ground to the winding of relay C1, operating said relay which locks up to the same ground through its No. 1 contacts. Closure of the lower contact of interrupter II1 applies the same ground through No. 2 contacts of relay C1 to the winding of relay C2, operating this relay which locks up to the same ground through its No. 1 contacts. The No. 2 contacts of this relay open the holding circuit of relay H, releasing relay H and, in turn, relays H2 and H3. Release of relay H3 disconnects ground at its No. 2 contacts from conductor 124 causing the trunk-register link 21 to disconnect the register from the trunk.

When relay B operates, ground is connected through its No. 2 contacts over conductor 126, extended through the trunk-register link 21 and within bracket 123, to the winding of relay AL2, causing the operation of this relay. If this occurs at any time after the connection of the register to the trunk and before the operation of relay C2, the circuit, previously traced, which supplies ground to the swinger of interrupter II1 will be opened at No. 3 back contact of relay AL2 and relay C2 will not be operated nor the register released.

Assuming that the register has not been disconnected from the trunk and that relay B has operated, operating relay AL2, the No. 3 contacts of this latter relay open the circuit to interrupter II1 and connect the ground at No. 3 contacts of relay H2 to the winding of relay AL1 operating this relay which locks up through its No. 1 contacts to the same ground. The connection of the register to the trunk remains under the control of calling station 1 since, if the receiver is replaced at that station, relay A will be released by the opening of its circuit at the switchhook contacts of station 1, releasing in turn, relays B and AL2. Relay AV will then operate from battery through its winding, No. 2 front contact of relay AL1 and No. 3 back contact of relay AL2 to ground at No. 3 contacts of relay H2, locking up through its No. 2 front contact to ground at No. 1 contacts of relay H3 and opening at its No. 2 back contact the holding circuit of relay H, releasing this relay and, in turn, relays H2 and H3 causing the disconnection of the register.

*Registration of calling-line information*

If the register is not disconnected from the trunk, operation of relay AL2 connects battery through resistance RR5 and No. 2 contacts of said relay, conductor 211, and No. 1 contacts of relay IRL to conductor 127, and ground at its No. 1 contacts to conductor 128, within bracket 129, to the register-identifier connector 19, indicated but not shown in Fig. 1, causing the register-identifier connector to select an idle identifier 20, also indicated but not shown in Fig. 1, from a group of identifiers common to the originating office and other offices and to connect said selected identifier to the register. The identifier 20, shown and described in the copending application of Gooderham Serial No. 448,782, filed June 27, 1942, applies a tone through condenser TCN over conductor 130 within bracket 123, extended through the trunk-register link and controller 21, thence through condenser STC, the right-hand coil of autotransformer TNS and No. 1 contacts of relay B to the sleeve conductor 118 of the calling line. The identifier 20 operates in a manner fully described in the said Gooderham application to test for this tone and to determine thereby the office unit in which the calling line is located and the number of said calling line. It then causes the operation of one of the ten register relays 00 to 09 to register the number of the office unit in which the calling line is found to be located, two of the register relays TH0 to TH7 to register the thousands digit of the calling-line number, two relays of a set of register relays (not shown) similar to relays TH0 to TH7 to register the hundreds digit, two relays of a set of register relays (not shown) similar to relays TH0 to TH7 to register the tens digit, and two of the register relays U0 to U7 to register the units digit, in accordance with the following code:

| Office Unit Digit Registered | Relay Operated |
|---|---|
| 0 | 00 |
| 1 | 01 |
| 2 | 02 |
| 3 | 03 |
| 4 | 04 |
| 5 | 05 |
| 6 | 06 |
| 7 | 07 |
| 8 | 08 |
| 9 | 09 |

| Number Digits Registered | Relays Operated in Each Register |
|---|---|
| 0 | −3, −5 |
| 1 | −2, −5 |
| 2 | −1, −5 |
| 3 | −3, −4 |
| 4 | −2, −4 |
| 5 | −1, −4 |
| 6 | −2, −3 |
| 7 | −1, −3 |
| 8 | −1, −3 |
| 9 | −4, −5 |

For example, if the calling line is determined to be in the second office unit of the office units served by the particular identifier used and if, further, the number of said calling-line is determined to be 5094, then relay 01, relays TH0 and TH4, the third and fifth of the relays (not shown) provided for registering the hundreds digit of the calling-line number, the fourth and fifth of the relays (not shown) provided for registering the tens digit of the calling-line number, and relays U1 and U4 will be operated.

Conductor 131 within bracket 129 which is grounded in the identifier 20, is connected to No. 1 and No. 2 contacts of relay 09 and extended through contacts of relays 08 to 00 in the manner shown in Fig. 7 and through contacts of all the other register relays in the manner illustrated in Fig. 13, so that it will be closed through to the upper winding of relay LK2 if one and only one of the relays 00 to 09 and two and only two of the relays in each of the other four sets of register relays are operated. When the proper number of register relays has been operated by the identifier, this conductor is closed through, operating relay LK2. Ground at No. 1 contacts of relay LK2 then locks up all of the operated register relays through their own contacts. Ground at No. 1 contacts of relay LK2 is also carried to the identifier through the contacts of the several operated register relays and within bracket 132, causing the identifier to ground conductor 133, within bracket 129 operating relay IRL. Ground through No. 2 contacts of relay IRL locks up relay LK2 through its No. 2 contacts and lower winding. Relay IRL locks up through its No. 3 contacts and conductor 134 to ground at No. 1 contacts of relay H2. The opening of No. 1 contacts of relay IRL disconnects battery at No. 2 contacts of relay AL2 from conductor 127, causing the register-identifier connector 19 to disconnect the identifier 20 from the register.

*Connection of register-sender to tandem sender*

When registration of the called-line information in the tandem sender, as previously described, has been completed, relay WT, in operating, completes a circuit from battery through the winding of relay WT1 over conductor 135, through No. 2 contacts of relay WT, conductor 136, conductor 80, and No. 3 contacts of relay ON1 to ground, operating relay WT1. The No. 3 contacts of relay WT1 connect the same ground through No. 1 back contact of relay GR to the winding of relay SS2, operating relay SS2. Operation of relay WT1 also closes a circuit from battery through the winding of relay BD, No. 3 back contact of relay GR, No. 1 front contact of relay WT1, conductor 137, No. 4 contacts of relay CK4, No. 1 front contact of relay RV7, conductor 114, No. 1 contacts of relay ON1, conductor 115 within bracket 83, extended through the sender link and controller 11 and within bracket 58, to tip conductor 53 of the trunk, and from ground at No. 2 back contact of relay GR through No. 2 front contact of relay WT1, conductor 138, No. 1 contacts of relay CK4, No. 3 front contact of relay RV7, conductor 111, No. 2 contacts of relay ON1, conductor 112 within bracket 83, extended through the sender link and controller 11 and within bracket 58, to the ring conductor 54 of the trunk. These connections discharge any accumulated electrical charge on the conductors of the trunk. Relay BD may operate momentarily but without effect. When the trunk is cut through by the operation of relay RE, as previously described, relay BD operates from battery through its winding over the above-traced path to conductor 53 of the trunk, No. 1 back contact of relay TR, No. 1 front contact of relay TC1, upper left-hand winding of coil C, No. 1 contacts of relay RE, lower left-hand winding of coil C, No. 4 front contact of relay TC1, No. 2 back contact of relay TR, conductor 54 of the trunk and over the previously traced path to ground at No. 2 back contact of relay GR. Operation of relay BD operates relay BD1 and the contacts of relay BD1 connect ground to conductors 139 and 140 to the sender connector 23, causing the said connector to connect an idle register-sender, such as is shown in Figs. 5, 6, 11, 12, 17 and 18, to the tandem sender. The sender connector employed in the present embodiment of the invention is similar to and operates in the same manner as the tandem marker connector described in the Patent No. 2,235,803, granted to W. W. Carpenter on March 18, 1941, and reference may be had to that patent for an understanding of its construction and operation.

*Transmission of calling-line information to register-sender*

When an idle register-sender is connected to the tandem sender, ground is applied in the sender connector 23 to conductor 141, causing operation of relay GR, which locks up through its own No. 1 front contact and No. 3 contacts of relay WT1 to the previously-traced ground on conductor 135. Relay GR, at its No. 3 back contact, opens the circuit of relay BD, releasing said relay, and at its No. 2 and No. 3 front contacts connects a high voltage source HV through No. 1 and No. 2 front contacts of relay SS2 and No. 1 and No. 2 front contacts of relay WT1 thence over the previously-traced paths to the conductors 53 and 54 of the trunk, thence from conductor 53 through No. 1 back contact of relay TR, No. 1 front contact of relay TC1, upper left-hand winding of coil C and No. 1 contacts of relay RE to gas-filled tube BDT and from conductor 54 through No. 2 back contacts of relay TR, No. 4 front contacts of relay TC1, and lower left-hand winding of coil C to gas-filled tube BDT. In operating, relay GR opens, at its No. 1 back contact, the circuit of relay SS2, releasing relay SS2 and the release of said relay disconnects the source of high voltage HV. However, relay SS2 is a slow-release relay so that high voltage is maintained on the conductors 53 and 54 of the trunk for a time sufficient to fire tube BDT and operate relay SX.

The contacts of relay SX apply ground to conductor 142 extended through the trunk register link 21 and within bracket 123 to the winding of relay S1, operating said relay. When relay SS2 releases, removing the high voltage, relay SX releases and relay S2 operates in series with relay S1 through contacts of relay S1 to ground at No. 1 contacts of relay H. Relay S2 completes a circuit from battery through the winding of relay TR, conductor 130 extended through the trunk register link 21 and within bracket 123 and No. 1 contacts of relay S2 to ground, operating relay TR, which, through its No. 1 front contact, connects conductor 53 of the trunk over conductor 143 extended through the trunk register link 21 to the upper right-hand winding of coil ACC and, through its No. 2 front contact, connects conductor 54 of the trunk over conductor 144 extended through the trunk register link 21 to the lower right-hand winding of coil ACC preparatory to the transmission of the calling-line information, registered in the register, to the register-sender.

Transmission of the calling-line information to the register-sender is accomplished by a series of alternating current pulses from the register to the register-sender, each pulse composed of a combination of two of five electrical frequencies designated as frequencies A, B, C, D and E. A sixth frequency F is used in combination with frequency A as a priming signal and, in combination with frequency E, as a start signal.

When the registration of the calling-line information in the register, as previously described, is completed, relay IRL remains locked up through its No. 3 contacts and conductor 134 to ground at No. 1 contacts of relay H2. When relay S2 operates, as described above, a circuit is completed from battery through the winding of relay SS1, No. 2 contacts of relay S2, conductor 145, and No. 4 contacts of relay IRL to ground, operating relay SS1. Condenser PGC is normally charged by battery through resitsance PR, the lower winding of relay PG and resistance SR1. When relay SS1 operates, its No. 1 contacts ground resistance RR while its No. 2 contacts short-circuit condenser PGC through resistance SR1, the lower winding of relay PG, No. 5 back contact of relay PS and No. 2 contacts of relay SS1. The discharge of condenser PGC over this path through the lower winding of relay PG causes relay PG, which is a polarized relay of the "stay-put" type, to make its right-hand contact (if it is not already made). Relay PG1 then operates over a path from battery through the winding of said relay, right-hand contact of relay PG and No. 1 contacts of relay SS1 to ground, completing an obvious circuit for relay PS, which operates and locks up over its No. 4 contacts to ground at No. 1 contacts of relay AV. Relay PP operates over a circuit from battery through the winding of said relay, No. 4 back contact of relay PP', No. 4 front contact of relay PG1, and No. 3 contacts of relay PS to ground.

The upper left-hand winding of coil ACC is now connected through No. 2 contacts of relay PG1, No. 1 contacts of relay PS, No. 1 back contact of relay PP', and conductor 146, and the lower left-hand winding of coil ACC is connected through No. 3 contacts of relay PG1, No. 2 contacts of relay PS, No. 2 back contacts of relay PP', and conductor 147 to a source of frequencies A and F indicated in Fig. 7. These frequencies, in combination, constitute the priming signal and are transmitted through coil ACC, conductors 143 and 144 extended through the trunk register link 21, and No. 1 and No. 2 front contacts of relay TR to conductor 53 and 54 of the trunk, thence through the sender link and controller 11, the tandem sender, and the sender connector 23 to the register-sender where they perform functions which will be described later.

On the operation of relay PS, as described above, the opening of its No. 5 back contact disconnects from the windings of relay PG and resistance PR, the ground applied by the No. 2 contacts of relay SS1. Condenser PGC then charges from battery through resistance PR, the lower winding of relay PG and resistance SR1. The charging current through the lower winding of relay PG holds the armature on its right-hand contact for a time, the current from battery through resistance RR1 and upper winding of relay PG in parallel with resistance RR, which tends to move the armature to its left-hand contact, not being strong enough to overcome the effect of the current in the lower winding. As condenser PGC charges, however, the charging current decreases and the armature of the relay is moved to its left-hand contact by the current in the upper winding. The opening of the right-hand contact of relay PG opens the circuit of and releases relay PG1 which, at its No. 2 and No. 3 contacts, opens the circuit of coil ACC, terminating the transmission of the priming signal.

Relay PP' now operates in series with relay PP through contacts of relay PP to ground at No. 2 contacts of relay H2. The No. 3 contacts of relay PP' short-circuit resistance SR1 to shorten the charging time of condenser PGC. Relay PG, also connects ground from No. 1 contacts of relay SS1 through the left-hand contact of relay PG, No. 1 contacts of relay FP, and No. 5 front contact of relay PS to the windings of relay PG and to resistance PR. Condenser PGC now discharges through the lower winding of relay PG and over the path traced to ground at No. 1 contacts of relay SS1, moving the armature of relay PG to its right-hand contact. Relay PG1 then operates again over the previously traced path and its No. 2 and No. 3 contacts again connect the windings of coil ACC over previously traced paths to a source of frequencies.

Relay PG continues to make alternately its front and back contacts, successively connecting, through the operations of the associated relays as described, the windings of coil ACC to sources of frequencies, the successive charging and discharging times of condenser PGC serving to regulate the time during which the frequencies are applied to coil ACC.

When relay PG makes its front contact for the second time, relay PP' having been operated as described, the left-hand windings of coil ACC are connected to sources of frequencies through No. 2 and No. 3 contacts of relay PG1, No. 1 and No. 2 contacts of relay PS, No. 1 and No. 2 front contacts of relay PP1, conductors 148 and 149, No. 2 and No. 1 back contacts of relays STC', SC' . . . DC', CC', and BC', and No. 4 and No. 5 contacts of register relays 00 to 09. One of these latter relays was operated, as previously described, to register the number of the office unit in which the calling line was found by the identifier to be located. By suitable connections of the contacts of these relays to the sources of frequencies, the particular combination of frequencies connected through to coil ACC by the contacts of said relays is that which corresponds to the first digit of the calling-office code, in accordance with the following table:

| Digit | Frequencies |
|---|---|
| 0 | A, B |
| 1 | A, D |
| 2 | B, D |
| 3 | D, E |
| 4 | B, E |
| 5 | C, D |
| 6 | A, C |
| 7 | B, C |
| 8 | C, E |
| 9 | A, E |

For example, if relay 03 were operated to register the calling-office unit number and the digit code of that office is 226, then the No. 4 and No. 5 front contacts of relay 03 are connected to sources of frequencies B and D and relay 03 being operated, connects those frequencies over the above-traced paths to the left-hand windings of coil ACC.

Upon the closure of the left-hand contact of relay PG for the third time, relay BL' operates through No. 3 back contact of relay BC', conductor 150, No. 4 front contact of relay PP', No. 4 front contact of relay PG1 to ground at No. 3 contacts of relay PS. When relay PG then breaks its left-hand contact, releasing relay PG1, transfer relay BC' operates in series with relay BL' through contacts of relay BL', conductor 151 and conductor 134, to ground at No. 1 contacts of relay H2. The No. 1 and No. 2 front contacts of relay BC' connect the windings of coil ACC over the previously traced paths to the No. 6 and No. 7 contacts of register relays 00 to 09 and the operated register relay connects the windings of coil ACC to a combination of frequencies corresponding to the second digit of the calling-office code. In a similar manner, in conjunction with No. 8 and No. 9 contacts of register relays 00 to 09 and the associated relays CL' and CC', a combination of frequencies corresponding to the third digit of the calling-office code, and in conjunction with the other sets of register relays and their associated transfer relays, successive combinations of frequencies corresponding to the thousands, hundreds, tens and units digits of the registered calling-line number are connected to the windings of coil ACC for transmission to the register-sender.

The operation of relay STC', in a similar manner to that described for relay BC', connects through its No. 1 and No. 2 front contacts, over the previously traced circuit to the windings of coil ACC, thence over conductors 152 and 153, a combination of frequencies E and F, constituting the start signal. Operation of relay STC' also completes a circuit for relay FP from battery through its winding and No. 3 normal contact, conductor 154, No. 3 front contact of relay STC', SC' . . . DC', CC' and BC', conductor 150, No. 4 front contact of relay PP', No. 4 front contact of relay PG1, and No. 3 contacts of relay PS to ground. Relay FP operates over this path and locks up through its own No. 3 front contact to ground at No. 1 contacts of relay H2. The No. 1 contacts of relay FP open the circuit of the left-hand contact of relay PG preventing further operations of the latter relay which remains with its right-hand contact open. When relay PG1 then releases, relay AV is operated by battery through its winding, No. 2 contacts of relay FP, No. 4 normal contacts of relay PG1, and No. 3 contacts of relay PS to ground, and locks up through its No. 2 front contact to ground at No. 1 contacts of relay H3. The No. 1 contacts of relay AV open the locking ground of relay PS releasing said relay, and the No. 2 contacts of relay AV open the locking ground of relay H, releasing said relay, and, in sequence, relays H2, H3, S1 and S2. Release of relay H3 releases relay AV. Relay H3 is a slow-release relay giving time for the release of the other mentioned relays. Release of relay S2 disconnects ground at its No. 1 contacts from conductor 130, releasing relay TR in the trunk. Release of relay H3 also disconnects ground at its No. 2 contacts from conductor 124, causing the trunk register link 21 to disconnect the register from the trunk.

Registration of calling-line information in register-sender

When the register-sender is connected to the tandem sender, as previously described, conductor 155 is grounded in the sender connector 23, operating relay ACP through No. 2 contacts of relay AST. The pairs of relays AC and AL, BC and BL, CC and CL, THC and THL . . . UC and UL then operate in cascade. Relays AC and AL operate in series over conductor 156, back contact of relay SS, conductor 157, and No. 6 contacts of relay ACP to ground, locking up to the same ground through No. 1 contacts of relay AL and conductor 157. Relays BC and BL operate through No. 2 contacts of relay AL and lock up in the same manner, in turn completing a circuit for the next pair of relays CC and CL which, in turn, complete a circuit for the next pair of relays until all of the said relays have operated and locked up in the same manner. Relay SS also operates through No. 2 contacts of relay AL and locks up to the same ground on conductor 157 through its front contact. The No. 5 contacts of relay ACP complete a circuit for relay ON, which operates and locks up through its No. 3 contacts, conductor 159 within bracket 160, and No. 2 back contact of relay PC to ground. The No. 1 contacts of relay ON complete the circuit of relay BH, operating said relay and the contacts of relay BH ground conductor 161 to the sender connector 23 to cause the register-sender to test busy after it is disconnected from the tandem sender. The operations described above prepare the register-sender to receive and register the calling-line information from the register at the originating office.

The register-sender comprises frequency selective channels (shown in Fig. 17), each of which is responsive to one of the frequencies transmitted by the calling line register and received through transformer TRG. The frequencies are transmitted in combination of two frequencies, each combination representing the priming signal, a digit of the calling line information, or the start signal, as previously described. Two channels respond to each of the combinations of frequencies transmitted and operate two of the relays CLA and CLF corresponding to the two frequencies of the combination. The register-sender used in the present embodiment of this invention is similar to the register-sender disclosed in the Patent No. 2,237,742, granted to A. A. Lundstrom on April 8, 1941, and reference may be had to that patent for a more complete description of the construction and operation of the frequency-selective channels.

Upon receipt of the priming signal and the consequent operation of relays CLA and CLF, which responds to the frequencies A and F transmitted in said signal, relay KP1 is operated by battery through its upper winding, No. 12 back contact of relay KP2 and right-hand contact of relay CLA to ground. Relay KP2 then operates over a circuit from battery through No. 3 contacts of relay ACP, conductor 162 within bracket 163, winding of relay KP2, right-hand contact of relay KP1, No. 9 normal contact of relay CLC to ground and left-hand contact of relay CLC to ground and locks up to ground through its No. 8 contacts. Battery from relay ACP over conductor 162 and through the lower winding of relay KP1 also holds said relay operated. The operation of relay KP2 closes through the six conductors 164 within bracket 163 between the right-hand contacts of relays CLA to CLF and the windings of translator relays TA to TF, respectively.

The responses of the frequency selective channels to each combination of frequencies transmitted for a digit of the calling line information, or for the start signal, operate two of the relays CLA to CLF whose right-hand contacts ground two of the conductors 164, operating the corresponding two of the translator relays TA to TF. Operation of two of the translator relays TA to TF grounds, through their contacts, none, one, two or three of the conductors 165, 166, 167 and 168 depending upon the combination of translator relays operated, thereby operating the corresponding relays of the register relays A1 to A4 whose upper windings are connected through Nos. 2, 3, 4 and 5 front contacts of relay AC and conductors 165, 166, 167 and 168 to contacts of translator relays TA to TF, in accordance with the following code:

| Translator Relays Operated | Register Relays Operated |
| --- | --- |
| TA and TB | None |
| TA and TD | A1 |
| TB and TD | A2 |
| TD and TE | A1 and A2 |
| TB and TE | A3 |
| TC and TD | A4 |
| TA and TC | A1 and A4 |
| TB and TC | A2 and A4 |
| TC and TE | A1, A2 and A4 |
| TA and TE | A3 and A4 |

For example, if relays CLB and CLE are operated by the frequency-selective channels, which will be the case if frequencies B and E corresponding to the digit 4 are transmitted, translator relays TB and TE will be operated. Then battery through the upper winding of relay A3, No. 3 front contact of relay AC, conductor 167, No. 3 contacts of relay TB and No. 5 contacts of relay TE to ground operates relay A3.

The register relays operated lock up through their lower windings and lower contacts over conductor 169 to ground at No. 2 contacts of relay ON, while the translator relays release upon the release of the channel relays after the termination of the transmission of frequencies by the register.

Figure 6:
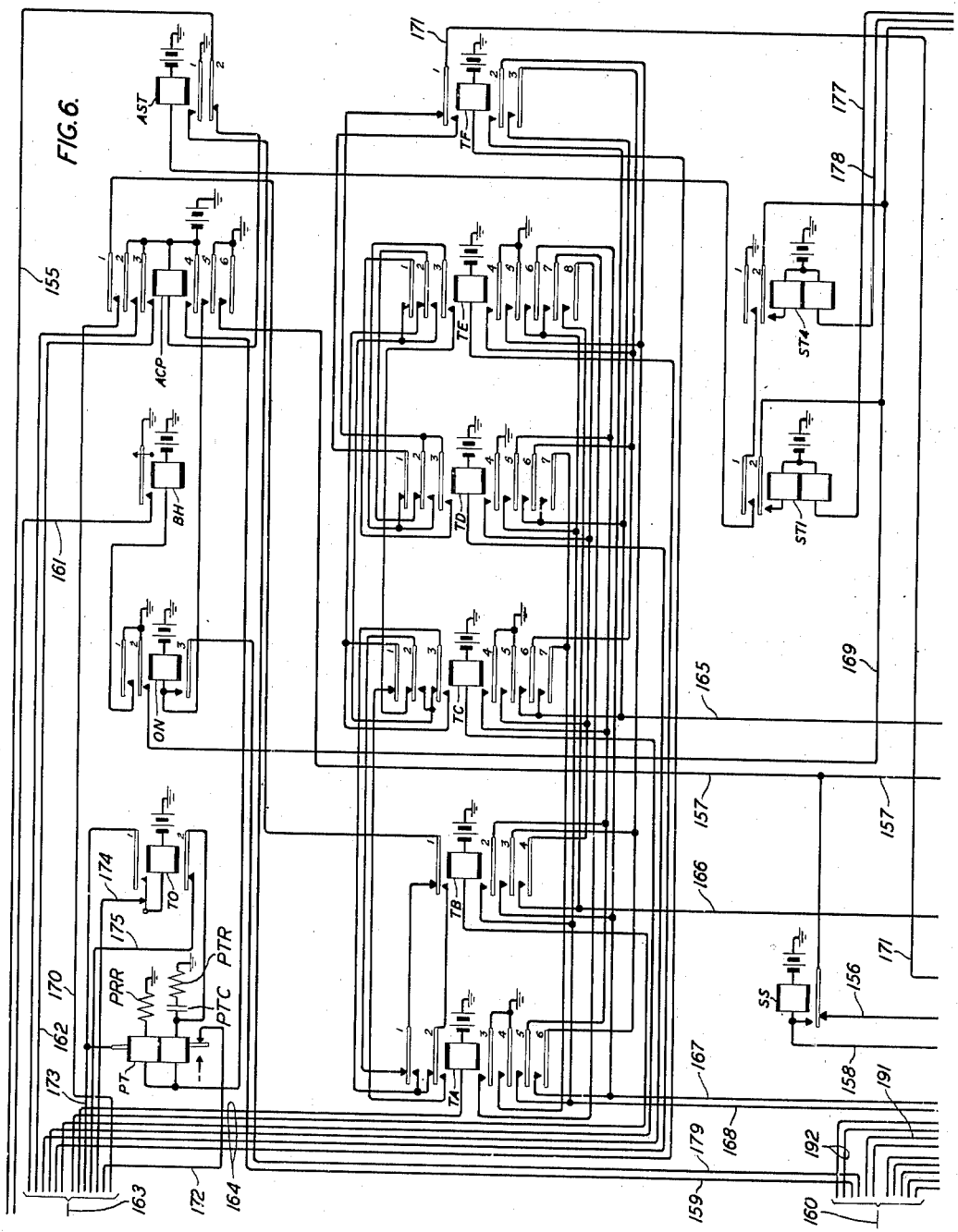

The connections of the contacts of the translator relays TA to TF are so arranged, as shown in Fig. 6, that ground through the left-hand contact of relay CK3, conductor 170 within bracket 163 and No. 1 contacts of relay ACP will be connected through to conductor 171 if two and only two of the translator relays TA to TF are operated. When two of these relays have been operated, ground on conductor 171 through No. 1 front contact of relay AC short-circuits relay AL, releasing said relay. Upon the release of the operated translator relays, ground is removed from conductor 171, releasing relay AC.

Upon receipt of the next transmitted combination of frequencies, two of the channel relays CLA to CLF are operated by the frequency-selective channels, operating, in turn, two of the translator relays TA to TF, and, thereby, two of the register relays B1 to B4 which are now connected to conductors 165, 166, 167 and 168 by Nos. 2, 3, 4 and 5 back contacts of relay AC, to register the second digit. The next operation of two of the translator relays again closes through ground to conductor 171 short-circuiting and releasing relay BL and the release of the operated translator relays releases relay BC, transferring conductors 165, 166, 167 and 168 to the next set of register relays CC1 to CC4, to register the third digit. In a similar manner, each of the successive digits transmitted by a combination of frequencies from the register, is registered in the register-sender on a set of register relays in accordance with the code given above.

Relays PT and TO are timing relays which ensure that the grounds applied to conductors 164 by channel relays CLA to CLF are maintained on said conductors long enough to permit the operation of the corresponding translator relays. The operation of relay ACP, as previously described, connects battery through its No. 4 contacts to the windings of relay PT. Current flowing through the upper winding of relay PT and resistance PRR tends to move the armature of the relay from its right-hand contact but is overcome by the effect of the current through the lower winding of relay PT, No. 2 contacts of relay TO, conductor 175 within bracket 163, to ground at left-hand contact of relay CK2. In the operation of the selective channels of the register-sender, relays SP, CK3, CK1, and CK2 are operated by the response of the selective channels to transmitted frequencies and remain on their right-hand contacts as long as said frequencies are being received. Relay TO then operates over a circuit from battery through the winding of said relay, No. 1 normal contact of said relay, conductor 174 within bracket 163, right-hand contact of relay CK1, conductor 172 within bracket 163, right-hand contact of relay PT, conductor 173 within bracket 163, and right-hand contacts of relays CK2 and SP to ground, and locks up over its No. 1 front contact to the same ground on conductor 173. Condenser PTC now charges from battery at No. 4 contacts of relay ACP through the lower winding of relay PT and through resistance PTR to ground. Even though relays CK3, CK1 and CK2 now release and make their left-hand contacts, the charging current through the lower winding of relay PT holds said relay on its right-hand contact and such of the channel relays CLA to CLF as are operated by the response of the frequency-selective channels and relay SP are held operated by battery through the winding of relay TO, No. 1 normal contact of said relay, right-hand contact of relay PT, conductor 172 within bracket 163, resistance CKR, conductor 176, middle windings of relays CLA to CLF and upper winding of relay SP to ground.

As condenser PTC charges, the charging current through the lower winding of said relay decreases, allowing the current through the upper winding of said relay to move the armature from the right-hand contact. This opens the previously traced circuit through the middle windings of the channel relays CLA to CLF releasing such of said relays as were operated and relay SP and, in turn, such of the translator relays TA to TF as were operated by the operated channel relays. Release of relays SP releases relay TO. Ground is again connected to the lower winding of relay PT through No. 2 contacts of relay TO, conductor 175 within bracket 163, and left-hand contact of relay CK2, discharging condenser PTC through resistance PTR and causing relay PT to again make its right-hand contact. This cycle of operations is repeated in connection with each combination of frequencies transmitted to the register-sender. The capacity of condenser PTC is so chosen in relation to the values of resistances PRR and PTR and the characteristics of relay PT that channel relays which are operated by the selective channels of the register-sender are held operated long enough to ensure operation of the associated translator relays.

The final frequencies transmitted are those of the start signal which, in accordance with the code given above, cause the operation of translator relays TE and TF, grounding conductors 165 and 167. Relay ST1 then operates from battery through its lower winding, conductor 177, No. 3 back contacts of relays UC . . . THC, CC, BC and AC to ground on conductor 167, and locks up over its No. 2 contacts and conductor 169 to ground through No. 2 contacts of relay ON, while relay ST4 operates from battery through its lower winding, conductor 178, No. 5 back contacts of relays UC . . . THC, CC, BC and AC to ground on conductor 165 and locks up through its No. 2 contacts to ground at No. 2 contacts of relay ON. Relay AST operates from battery through its winding, No. 1 contacts of relays ST1 and ST4 to ground. The No. 2 contacts of relay AST open the circuit of relay ACP, releasing that relay and the No. 1 contacts of relay AST connect ground to conductor 179 within bracket 160, operating relay ST, which is an indication that the registration of the calling-line information in the register-sender has been completed.

Connection of register-sender to trunk

Figure 5:
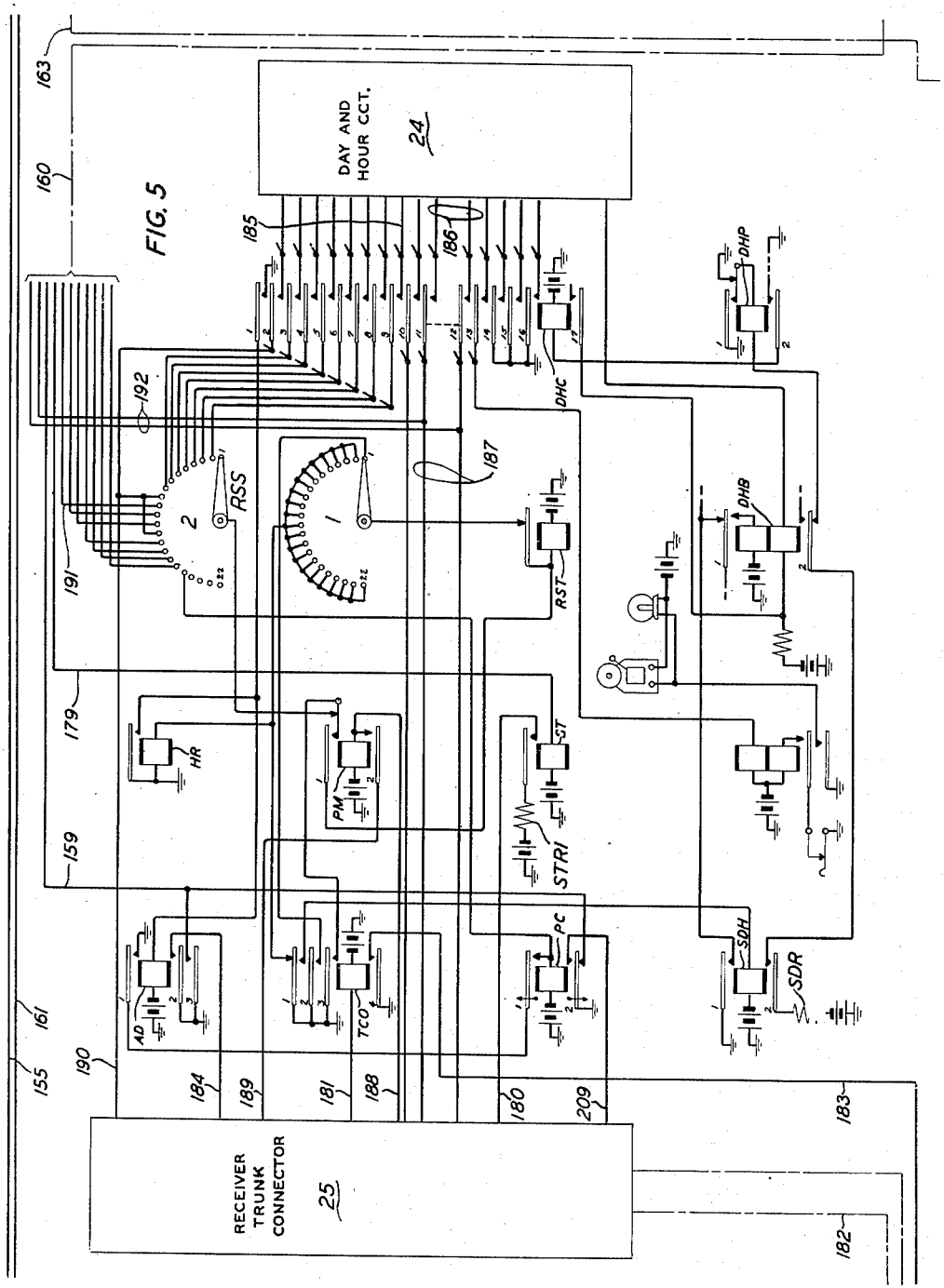
Figs. 5, 6, 11, 12, 17 and 18 show the circuit of the register-sender.

The operation of relay ST connects battery through protective resistance STR1 to conductor 180 to the register-trunk connector 25, indicated but not shown in Fig. 5, causing said connector to connect the register-sender to the trunk. The register-trunk connector used in the present embodiment of this invention is similar to the tandem marker connector disclosed in Patent 2,235,803, granted to W. W. Carpenter on March 18, 1941, and reference may be had to said patent for an understanding of its construction and operation.

Recording calling-line information

When the register-sender has been connected to the trunk and the trunk is ready for recording of the calling-line information (indicated by switch DS of the trunk being in position No. 1, as previously described) relay TCO operates from battery through its winding over conductor 181 extended through the register-trunk connection 25 and within bracket 182, No. 3 contacts of relay E, conductor 79, and No. 1 terminal of arc No. 1 of switch DS to ground on the brush of that arc. The No. 4 contacts of relay TCO ground conductor 183 to sender connector 23, causing said connector to disconnect the register-sender from the tandem sender. The relay SDH is also operated through No. 1 front contact of relay TCO, closing a circuit from battery through protective resistance SDR, No. 2 contacts of said relay and No. 2 back contacts of relay DHB to a series of chain relays, of which relay DHP is one, operating one of said relays, such as relay DHP. The No. 2 contacts of relay DHP connect ground to the winding of relay DHC, operating said relay which connects the register-sender to an idle day and hour circuit 24 of any suitable form for indicating the month, day, hour and tenths of an hour.

Closure of the No. 1 contacts of relay DHC causes the operation of relay AD. The No. 3 contacts of relay AD ground conductor 159 within bracket 160, holding relay ON operated through its No. 3 contacts. Stepping magnet RST of switch RSS operates from battery through its winding, its own contacts, the brush of arc No. 1 of switch RSS, the No. 1 terminal of said arc and No. 2 contacts of relay TCO to ground, and releases by breaking its own circuit, moving the brushes of switch RSS to the No. 2 terminals. Battery through the winding of stepping magnet RST, the contacts of said stepping magnet, the brush and No. 2 terminal of arc No. 1 of switch RSS, and the winding of relay HR to ground operates relay HR, which, through its contacts, maintains relay AD operated as long as the brushes of switch RSS are on any terminals except the No. 1 terminals. The No. 2 contacts of relay AD connect ground to conductor 184 extended through the register-trunk connector 25 and within bracket 182 to the winding of relay MS, which operates and starts the motor M of the printing device. With the brushes of switch RSS on the No. 2 terminals, ground through No. 3 contacts or relay TCO, No. 1 normal contact of relay PM, the brush and No. 2 terminal of arc No. 2 of switch RSS, and No. 9 contacts of relay DHC is connected to conductor 185 to the day and hour circuit 24. The day and hour circuit returns ground on one of the ten conductors 186, the particular conductor depending upon the month setting of the day and hour circuit. This ground, extended through a contact of relay DHC and over one of the conductors 187 through the register-trunk connector 25 and within bracket 182 to one of the segments of the commutator COM of the printing device causes a digit, corresponding to the month setting of the day and hour circuit, to be printed on the tape in the manner previously described in connection with the recording of the called-line information. Operation of the print magnet PRT completes a circuit for relay PM from battery through the winding of said relay, conductor 188 extended through the register-trunk connector 25 and within bracket 182, conductor 203, and contacts of print magnet PRT to ground, operating relay PM which locks up through its No. 2 contacts, conductor 189 extended through the register-trunk connector 25 and within bracket 182 and conductor 71, to the same ground. The No. 1 front contacts of relay PM connect ground through No. 3 contacts of relay TCO to the winding of the stepping magnet RST of switch RSS, operating the stepping magnet. Release of the print magnet PRT releases relay PM and, in turn, the stepping magnet RST, which advances the brushes of switch RSS one terminal.

The seven digits of the day and hour information are printed in the manner described above with the brushes of switch RSS on terminals Nos. 2 to 8 respectively. With the brushes of switch RSS on the No. 9 terminals, ground through No. 3 contacts of relay TCO is connected through No. 1 normal contact of relay PM and the brush and No. 9 terminal of arc No. 2 of switch RSS to conductor 190 extended through the register-trunk connector 25 and within bracket 182 to the dash segment of the commutator COM of the printing device, causing a dash to be printed on the tape.

With the brushes of switch RSS on the No. 10 terminals, the ground at No. 3 contacts of relay TCO is extended over the above traced path, and conductor 191 within bracket 169 to contacts of register relays A1 to A4 and is returned over one of the ten conductors 192, within bracket 169, and one of the conductors 187 extended through the register-trunk connector 25 and within bracket 182 to one of the segments of commutator COM, the particular conductor depending upon the combination of register relays operated, and being that conductor which causes a digit corresponding to the digit registered by relays A1 to A4, which is the first digit of the calling-office code, to be printed on the tape. With the brushes of switch RSS on the No. 11 and No. 12 terminals, the second and third digits respectively of the calling-office code are printed in a similar manner in connection with register relays B1 to B4 and CC1 to CC4 respectively. With the brushes of switch RSS on the No. 13 terminals, a dash is printed in the manner already described. With the brushes of switch RSS on the No. 14 to No. 17 terminals, the four digits respectively of the calling-line number are printed in a similar manner from the registrations on the other sets of register relays of the register-sender indicated in Fig. 18.

When the brushes of switch RSS reach the No. 18 terminals, relay PC operates over a circuit from battery through the winding of said relay, No. 18 terminal and brush of arc No. 2 of switch RSS No. 1 normal contact of relay PM and No. 3 contacts of relay TCO to ground and locks up through its No. 1 contacts to ground at No. 1 contacts of relay AD. The No. 2 contacts of relay PC disconnect ground from conductor 189 and connect it to conductor 200 extended through the register-trunk connector 25 and within bracket 182, No. 2 front contact of off-normal contacts DON to the winding of the rotary magnet DROT of switch DS, causing the rotary magnet to operate and move the brushes of switch DS to the No. 2 terminals. This disconnects ground on the brush of the No. 1 arc of switch DS from conductor 79 releasing relay TCO, which releases relay SDH and, in turn, relays DHP and DHC, thereby disconnecting the day and hour circuit 24. Relay AD does not release upon the release of relay DHC as it is held operated by relay HR, as previously described.

Relay TCO, upon releasing, connects ground through its No. 1 back contact to the terminals (except terminal No. 1) of arc No. 1 of switch RSS causing the stepping magnet RST of said switch to operate and release itself repeatedly, advancing the brushes of switch RSS to the No. 1 terminals. Relay HR then releases, releasing relay AD, and the No. 1 contacts of relay AD open the holding circuit of relay PC, releasing it. Relay PC is, however, a slow-release relay and before it releases, relay ON, which was locked up through No. 3 contacts of relay AD, releases due to the release of relay A. D. Release of relay ON opens the holding ground at its No. 2 contacts on conductor 169, releasing the operated register relays and its No. 1 contacts open the circuit of relay BH, which releases removing ground from conductor 155 to the register-trunk connector 25, causing the said connector to disconnect the register-sender from the trunk.

*Timing of call*

When the call is answered by the removal of the receiver at the called station 15, reversed battery at the incoming link (not shown) of the terminating office 14 over conductor 82 extended through tandem office links 13, the lower right-hand winding of coil C3, No. 1 contacts of relay D, winding of polarized relay CS, upper right-hand winding of coil C3, and conductor 81 extended through tandem office links 13 to ground at the terminating office, operates relay CS, which connects ground through its contacts and conductor 193 to the movable contact of interrupter II, for timing the duration of the conversation. When the interrupter makes its lower contact, relay I operates over a circuit from battery through its winding, the lower contact of interrupter II, conductor 193, and contacts of relay CS to ground and locks up to the same ground through its No. 2 contacts. When interrupter II makes its upper contact, relay CH operates over a circuit from battery through its winding, No. 3 contacts of relay I, upper contact of interrupter II, to the same ground on conductor 193, and locks up through its own No. 4 contacts, conductor 194, and No. 2 back contact of relay TR1 to ground. This operation introduces the delay customary in circuits of this type to ensure that timing of the call is instituted only by the answer of the called party and not by some momentary disturbance in the circuit.

Operation of relay CH connects the front contact of timing interrupter TMI through No. 5 contacts of said relay and No. 1 contacts of relay I to the winding of stepping magnet UST of switch US. When interrupter TMI makes its contact, the stepping magnet UST operates and when interrupter TMI breaks its contact, the stepping magnet UST releases, advancing the brushes of switch US one terminal. Interrupter TMI makes and breaks its contacts once every quarter minute. It therefore advances the brushes of switch US four terminals a minute. The No. 22 terminal of switch US is passed over by the connection of the stepping magnet UST, through its own contacts, to the No. 22 terminal of arc No. 3 of said switch, ground on the brush of said arc causing the operation of the stepping magnet when the No. 22 terminal is reached and the release of the stepping magnet by breaking its own circuit advancing the brushes of switch US one terminal, independent of the interrupter. The brushes of switch US, therefore, reach the No. 38 terminals at the end of nine minutes, assuming conversation time to have lasted that long. The rotary magnet TROT of switch TS then operates over a circuit from battery through its winding, No. 2 contacts of relay P2, terminal No. 38 and the brush of arc No. 6 of switch US, No. 5 back contact of relay P2, No. 1 contacts of relay I, No. 5 contacts of relay CH and contacts of interrupter TMI to ground, advancing the brushes of switch TS one terminal. The brushes of switch US are advanced by the next make and break of the contacts of interrupter TMI to the No. 39 terminals and pass over said terminals and No. 40 terminals by means of the connection of these terminals on arc No. 2 of switch US through the brush and terminals of arc No. 1 of switch TS to the stepping magnet UST of switch US. The operations of interrupter TMI during the tenth minute advance the brushes of switch US, in the manner described above, to the No. 44 terminals and the first closure of the contacts of interrupter TMI during the eleventh minute advances the brushes of switch US to the No. 1 terminals. A circuit is then completed from battery through the winding of stepping magnet UST, the contacts of said magnet, No. 3 back contact of relay P2, No. 2 front contact of relay CH, No. 1 front contact of off-normal contacts TON, No. 4 contacts of relay P2, terminal No. 1 of arc No. 3 of switch US, and the brush of said arc to ground, causing the stepping magnet UST to operate and release by breaking its own contacts thus moving the brushes of switch US to the No. 2 terminals.

This cycle is repeated for the duration of the conversation time (assuming said time does not exceed ninety-nine minutes) each quarter minute being registered by a step of switch US and each ten minutes by a step of switch TS. Replacement of the receiver at the called station 15 at any time opens the circuit of and releases relay CS which removes ground through its contacts from interrupter of switches US and TS.

*Recording conversation time*

When the receiver is replaced at the calling station 1, relay AA is released by the opening of its circuit at the switchhook contacts of station 1, releasing relay D, which, at its No. 1 contacts, opens the circuit of relay CS, releasing the latter relay. The No. 2 back contact of relay D connects ground over conductor 195, the No. 3 contacts of relay CH, and conductor 196 to the upper winding of relay D1, operating said relay. The No. 1 contacts of relay D1 open the circuit of relay D so that relay D cannot operate again and close through the trunk on a succeeding call before ticketing of the present call is completed.

Relay D1 connects ground through its No. 4 contacts, conductor 197 and conductor 68, to the winding of relay MS which operates and starts the motor M of the printing device. Relay P2 operates over a circuit from battery through its winding, conductor 198, No. 3 contacts of relay D1, No. 3 contacts of relay D2, conductor 199, and No. 6 contacts of relay CH to ground, if relay D2 is operated. Relay D2 will be operated if the brushes of switch DS have reached the No. 2 terminals after the completion of the recording of the called-line information, as previously described. If relay D2 has operated, relay P2 operates; if not, the operation of relays D2 and P2 will await the return of the brushes of switch DS to the No. 2 terminals. When relay P2 operates, its No. 7 contacts connect ground over conductor 200, No. 3 contacts of relay PH, the brush and No. 2 terminal of arc No. 2 of switch DS to conductor 201 causing the printing device to print a dash on the tape in the manner previously described. Operation of print magnet PRT connects ground through its contacts, conductor 71, conductor 202, No. 2 contacts of relay D1 and No. 1 contacts of relay D2 to the winding of relay PH, operating said relay, which locks up to the same ground through its No. 1 contacts and conductor 203. The No. 3 contacts of relay PH open the circuit of the brush of arc No. 2 of switch DS and the No. 2 contacts of relay PH connect the ground at No. 6 contacts of relay CH through conductors 199 and 204, to the rotary magnet DROT of switch DS, operating the rotary magnet to advance the brushes of switch DS to the No. 3 terminals. Release of print magnet PRT releases relay PH which again closes the circuit of the brush of arc No. 2 of switch DS.

If the duration of the call has been less than ten minutes the brushes of switch TS will be in normal position and its off-normal contacts TON will be in the position shown. Ground through No. 7 contacts of relay P2 over conductor 200 through No. 3 contacts of relay PH, will then be extended through the brush and No. 3 terminal of arc No. 2 of switch DS, conductor 205, No. 2 normal contact of off-normal contacts TON, and No. 5 front contact of relay P2 to the brushes of arcs No. 5 and No. 6 of switch US. If the brushes of switch US have not advanced beyond the first two terminals, which will be the case if the duration of the conversation time has not exceeded thirty seconds, this ground is extended through one of said first two terminals of arc No. 5 of switch US and No. 1 contacts of relay P2, to the asterisk segment of commutator COM, causing an asterisk to be printed on the tape. If the brushes of switch US have advanced beyond the No. 2 terminals, said ground is extended over one of the terminals of arc No. 5 of switch US through No. 6 contacts of relay P2 to the zero segment of the commutator COM, causing a zero to be printed on the tape. If, however, the brushes of switch TS are not in normal position, said ground is extended by No. 2 front contact of off-normal contacts TON to the brush of arc No. 2 of switch TS and, through the terminal on which said brush is resting, to the segment of commutator COM to which said terminal is connected, causing a digit corresponding to the number of tens of minutes measured by switch TS to be printed. The operation of printing said digit advances the brushes ow switch DS to the No. 4 terminals in the manner previously described, by which the aforesaid ground is extended through the No. 4 terminal of arc No. 1 of switch DS over conductor 206 to the brushes of arcs No. 1 and No. 4 of switch US. Said ground is further extended through the terminal on which the brush of arc No. 1 or No. 4 is resting to the segment of commutator COM to which said terminal is connected, causing a digit corresponding to the number of minutes and fraction of a minute measured by switch US to be printed. This printing operation advances the brushes of switch DS, to the No. 5 terminals where an asterisk is printed in the manner previously described and the brushes of switch DS advanced to the No. 6 terminals, where a second asterisk is printed in the same manner and the brushes of switch DS advanced to the No. 7 terminals. Relay TR1 then operates over a circuit from battery through its winding, terminal No. 7 and the brush of arc No. 1 of switch DS, No. 3 contacts of relay PH, conductor 209, and No. 7 contacts of relay P2 to ground. The No. 2 back contact of relay TR1 opens the holding circuit of relay CH, releasing said relay, which in turn, releases relay P2. Release of relay CH connects ground from the brush of arc No. 2 or No. 3 of switch US, through the terminal on which said brush is resting, No. 1 back contact of relay CH and contacts of stepping magnet UST to the winding of said stepping magnet which operates and releases repeatedly advancing the brushes of switch US until they reach the No. 1 terminals. Ground on the brush of arc No. 3 of said switch is then connected through No. 1 terminals of said arc, No. 4 contacts of relay P2, No. 1 front contact of off-normal contacts TON, and No. 2 back contact of relay CH to the winding of the release magnet TRLS of switch TS, operating said release magnet, which returns the brushes of switch TS to their normal positions. The opening of the No. 3 contacts of relay CH opens the circuit of and releases relay D1 which, in turn, releases relay MS, stopping the motor M of the printing device. Relay D1, in releasing, closes a circuit at its No. 1 contacts for relay D so that the latter relay may operate on a subsequent call.

If conversation time exceeds ninety-nine minutes, a printing operation takes place at the end of each ninety-nine minute period and a final printing operation at the termination of the call. At the end of the first ninety-nine minutes, the brushes of switch TS will have reached their No. 10 terminals. When the brushes of switch US move to the No. 39 terminals, relays D1 and AL3 operate over a circuit from battery through the upper winding of relay AL3, lower winding of relay D1, conductor 207, terminal No. 10 and the brush of arc No. 1 of switch TS, No. 39 terminal and the brush of arc No. 2 of switch US to ground. Relay AL3 locks up through its lower winding and its No. 1 contacts to ground at key ALK. Its No. 2 contacts close the circuit of the alarm bell ALB and alarm lamp ALP which operate to call the attention of the maintenance force at the tandem office to the unusual length of the call so that they may determine if a trouble condition is responsible rather than an actual call. Relay AL3, the alarm bell ALB and alarm lamp ALP may be released by the operation of key ALK but only when the upper winding of relay AL3 is deenergized by circuit operation.

Operation of relay D1 starts the motor M of the printing device and the printing of elapsed time measured proceeds as previously described. The brushes of switches US and TS are returned to normal by the operation of relay TR1, as before, and the brushes of switch DS are released, but before the brushes of the latter switch can return to normal, relay E operates over a circuit from battery through its winding, No. 1 contacts of relay TR1, conductor 208 and No. 4 contacts of relay I to ground, and locks up to the same ground through its No. 1 contacts. The No. 3 contacts of relay E open the circuit of conductor 131 preventing further printing operations until the brushes of switch DS return to normal. When the brushes of switch DS are in normal position and relay D2 has released, the front contact of interrupter RTI is connected through No. 4 contacts of relay D2 and No. 4 contacts of relay E to the winding of the rotary magnet DROT of switch DS. Closure of the contacts of interrupter RTI operates the rotary magnet and advances the brushes of switch DS to the No. 2 terminals. Relay D2 then operates from battery through its winding and No. 2 terminal of arc No. 1 of switch DS to ground on the brush of said arc and the No. 4 terminals of relay D2 open the circuit of interrupter RTI. The circuit is then ready to continue measurement of conversation time as before.

When the receiver is replaced at the called station 15, relay CS is released, as previously described, releasing relay I which, in turn, releases relay E. The printing of the final record of elapsed time and the disconnection of the register-sender then take place as on the shorter call previously described.

While I have described my invention and the means of utilizing the same in connection with its application to a specific network of telephone exchanges and equipment used therein, it is to be understood that various other applications and embodiments thereof may be made by those skilled in the art without departing from the spirit of the invention as defined within the scope of the appended claims.

What is claimed is:

1. In a telephone system for the automatic recording of items of record information pertaining to a telephone connection, the combination of a calling line having an identifying designation, a called line having an identifying designation, means operative to identify and register the designation of said calling line, a source of multifrequency currents operatively associated with said calling line identifying and registering means when the latter is operated for producing a series of multifrequency impulses indicative of said calling line designation, means operative to register the designation of said called line, a register-sender responsive to said series of multifrequency impulses, a recording device, and means whereby said recording device is responsive to said operated register-sender and to said called line registering means when operated for recording said calling line designation and said called line designation.

2. In a telephone system for the automatic recording of items of call-record information pertaining to a telephone connection, the combination of a calling line having an identifying designation, a called line having an identifying designation, means for establishing a connection between said calling line and said called line, a timing device for registering the duration of said connection, means for identifying and registering the designation of said calling line, a source of multifrequency impulses operatively associated with said calling line identifying and registering means when the latter is operated for producing a series of multifrequency impulses indicative of said calling line designation, means operative over said connection-establishing means to register the designation of said called line, a register-sender responsive to said series of multifrequency impulses over said connection-establishing means, a recording device, and means whereby said recording device is responsive to said operated register-sender, to said called line registering means when operated and to said timing device for recording said calling line designation, said called line designation and the duration of said connection.

3. In a telephone system for the automatic recording of items of call-record information pertaining to a telephone connection, the combination of a calling line having an identifying designation, a called line having an identifying designation, means for establishing a connection between said calling line and said called line, means for determining the time at which said connection is established, means for identifying and registering the designation of said calling line, a source of multifrequency impulses operatively associated with said calling line identifying and registering means when the latter is operated for producing a series of multifrequency impulses indicative of said calling line designation, means operative over said connection-establishing means to register the designation of said called line, a register-sender responsive to said series of multifrequency impulses over said connection-establishing means, a recording device, and means whereby said recording device is responsive to said operated register-sender, to said called line registering means when operated and to said time-determining means for recording said calling line designation, said called line designation and the time at which said connection is established.

4. In a telephone system for the automatic recording of items of call-record information pertaining to a telephone connection, the combination of a calling line having an identifying designation, a called line having an identifying designation, means for establishing a connection between said calling line and said called line, means for determining the time at which said connection is established, a timing device for registering the duration of said connection, means for identifying and registering the designation of said calling line, a source of multifrequency currents operatively associated with said calling line identifying and registering means when the latter is operated for producing a series of multifrequency impulses indicative of said calling line designation, means operative over said connection-establishing means to register said called line designation, a register-sender responsive to said series of multifrequency impulses over said connection-establishing means, a recording device, and means whereby said recording device is responsive to said operated register-sender, to said called line registering means when operated, to said time-determining means, and to said time-duration registering means for recording said calling line and called line designations, the time at which said connection is established and the duration of said connection.

5. In a telephone system for the automatic recording of items of call-record information pertaining to a telephone connection, the combination of a calling line having an identifying designation, a called line having an identifying designation, a trunk, means for establishing a connection between said calling line and said called line over said trunk, means operative to identify and register the designation of said calling line, a register-sender, alternating-current means operative under the control of said calling line identifying and registering means when the latter is operated for transmitting said calling line designation by multifrequency impulses to said register-sender over said trunk, means operative to register said called line designation, a record-ing device, and means whereby said recording device is responsive to said operated register-sender and to said called line registering means when operated to record both of said designations.

6. In a telephone system for the automatic recording of items of call-record information pertaining to a telephone connection, the combination of a calling line having an identifying designation, a called line having an identifying designation, a trunk, means for extending said calling line to said trunk, means operative to identify and register the designation of said calling line, a register-sender, alternating-current means operative under the control of said calling line identifying and registering means when the latter is operated for transmitting said calling line designation by multifrequency impulses to said register-sender over said trunk, means operative to register the designation of said called line, means for extending said trunk to said called line thereby to establish a connection between said calling line and said called line, means for determining the time at which said connection is established, a timing device for registering the duration of said connection, a recording device and means whereby said recording device is responsive to said operated register-sender, to said called line registering means when operated, to said time-determining means and to said timing device for recording the designation of said calling line, the designation of said called line, the time at which said connection is established, and the duration of said connection.

7. In a telephone system for the automatic recording of items of call-record information pertaining to a telephone connection, the combination of a calling line having an identifying designation, a called line having an identifying designation, a trunk, means for extending said calling line to said trunk, a first registering means responsive to signals from said calling line indicative of said called line designation for registering said called line designation therein, a second registering means connectable to said trunk at the remote end thereof, means responsive to said second registering means when so connected for transferring said called line designation from said operated first registering means to said second registering means over said trunk, means operative to identify and register said calling line designation, a register-sender connectable to the remote end of said trunk, alternating-current means operative under the control of said calling line identifying and registering means when the latter is operated for transmitting said calling line designation by multifrequency impulses to said register-sender over said trunk, a recording device at the remote end of said trunk, and means whereby said recording device is responsive to said operated register-sender and said operated second registering means for recording said calling line designation and said called line designation.

8. In a telephone system for the automatic recording of items of call-record information pertaining to a telephone connection, the combination of a calling line having an identifying designation, a called line having an identifying designation, a trunk, a first registering means connectable to said calling line and responsive when so connected to signals from said calling line indicative of said called line designation for registering said called line designation therein, means controlled by said operated first registering means for extending said calling line to said trunk, a second registering means connectable to the remote end of said trunk, means responsive to said second registering means when so connected for transferring said called line designation from said operated first registering means to said second registering means over said trunk, means controlled by said operated second registering means for establishing a connection between said trunk and said called line, means for determining the time at which said connection is established, means operative to identify and register the designation of said calling line, a register-sender connectable to said trunk at the remote end thereof, alternating-current means operative under the control of said calling line identifying and registering means when the latter is operated for transmitting said calling line designation by multifrequency impulses to said register-sender over said trunk, a recording device at the remote end of said trunk, and means whereby said recording device is responsive to said operated register-sender, to said operated second registering means and to said time-determining means for recording said calling line designation, said called line designation and the time at which said connection is established.

9. In a telephone system for the automatic recording of items of call-record information pertaining to a telephone connection, the combination of a calling line having an identifying designation, a called line having an identifying designation, a trunk, a first registering means connectable to said calling line and responsive when so connected to signals from said calling line indicative of said called line designation for registering said called line designation therein, means controlled by said operated first registering means for extending said calling line to said trunk, a second registering means connectable to the remote end of said trunk, means responsive to said second registering means when so connected for transferring said called line designation from said operated first registering means to said second registering means over said trunk, means controlled by said operated second registering means for establishing a connection between said trunk and said called line, means for determining the time at which said connection is established, timing means associated with said trunk for timing the duration of said connection, means operative to identify and register the designation of said calling line, a register-sender connectable to said trunk at the remote end thereof, alternating-current means operative under the control of said calling line identifying and registering means when the latter is operated for transmitting said designation by multifrequency impulses to said register-sender over said trunk, a recording device associated with said trunk at the remote end thereof, and means whereby said recording device is responsive to said operated register-sender, to said operated second registering means, to said time-determining means and to said timing means for recording said calling line designation, said called line designation, the time at which said connection is established, and the duration of said connection.

CHARLES G. MILLER.

REFERENCES CITED

The following references are of record in the file of this patent:

UNITED STATES PATENTS

| Number | Name | Date |
|---|---|---|
| 2,273,165 | Wright | Feb. 17, 1942 |
| 2,297,365 | Ostline | Sept. 19, 1942 |
| 2,369,868 | Taylor et al. | Feb. 20, 1945 |
| 2,370,736 | Kittredge | Mar. 6, 1945 |
| 2,373,908 | Ostline | Apr. 17, 1945 |